(12) United States Patent
Pawar et al.

(10) Patent No.: US 11,816,007 B1
(45) Date of Patent: Nov. 14, 2023

(54) ON-DEMAND SERVERLESS DISASTER RECOVERY

(71) Applicant: NetApp Inc., San Jose, CA (US)

(72) Inventors: Dnyaneshwar Nagorao Pawar, Bangalore (IN); Sumith Makam, Bangalore (IN); Roopesh Chuggani, Rajasthan (IN); Tijin George, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/824,120

(22) Filed: May 25, 2022

(51) Int. Cl.
  G06F 11/00 (2006.01)
  G06F 11/20 (2006.01)
  G06F 11/14 (2006.01)

(52) U.S. Cl.
  CPC ...... *G06F 11/2025* (2013.01); *G06F 11/1469* (2013.01); *G06F 2201/84* (2013.01)

(58) Field of Classification Search
  CPC ............ G06F 11/1446; G06F 11/1458; G06F 11/1469; G06F 11/202; G06F 11/2023; G06F 11/2025; G06F 11/2046; G06F 11/2053; G06F 11/2094
  See application file for complete search history.

(56) References Cited

U.S. PATENT DOCUMENTS

| | | | |
|---|---|---|---|
| 9,092,375 B1* | 7/2015 | Dalal | G06F 11/1451 |
| 2010/0325471 A1* | 12/2010 | Mishra | G06F 11/1484 |
| | | | 718/1 |
| 2015/0278046 A1* | 10/2015 | Zellermayer | G06F 11/1438 |
| | | | 714/4.11 |
| 2017/0132086 A1 | 5/2017 | Blackburn et al. | |
| 2018/0143881 A1* | 5/2018 | Singer | G06F 11/2094 |
| 2019/0391883 A1* | 12/2019 | Wang | G06F 11/203 |
| 2021/0406216 A1 | 12/2021 | Komatsu et al. | |

FOREIGN PATENT DOCUMENTS

EP  1882223 A2  1/2008

OTHER PUBLICATIONS

Invitation to Pay Additional Fee for Application No. PCT/US2023/067331, dated Aug. 30, 2023, 16 pages.

* cited by examiner

*Primary Examiner* — Michael Maskulinski
(74) *Attorney, Agent, or Firm* — COOPER LEGAL GROUP, LLC

(57) ABSTRACT

Techniques are provided for on-demand serverless disaster recovery. A primary node may host a primary volume. Snapshots of the primary volume may be backed up to an object store. In response to failure, a secondary node and/or an on-demand volume may be created on-demand. The secondary node may provide clients with failover access to the on-demand volume while a restore process restores a snapshot of the primary volume to the on-demand volume. In some embodiments, there was no secondary node and/or on-demand volume while the primary node was operational. This conserves computing resources that would be wasted by otherwise hosting the secondary node and/or on-demand volume while clients were able to access the primary volume through the primary node. Modifications directed to the on-demand volume are incrementally backed up to the object store for subsequently restoring the primary volume after recovery.

20 Claims, 24 Drawing Sheets

ON-DEMAND SERVERLESS DISASTER RECOVERY

BACKGROUND

A device such as a node stores data on behalf of a client within a volume. The volume is stored within local storage accessible to the device, such as within on-premise storage. The device may implement storage management functions for the client. For example, the device creates backups of the volume by creating snapshots of the volume. A snapshot of the volume captures a point-in-time representation of a state of the volume. The device uses the snapshot in order to restore the volume back to a state of the volume at which the snapshot was created.

DETAILED DESCRIPTION

Figure 1:
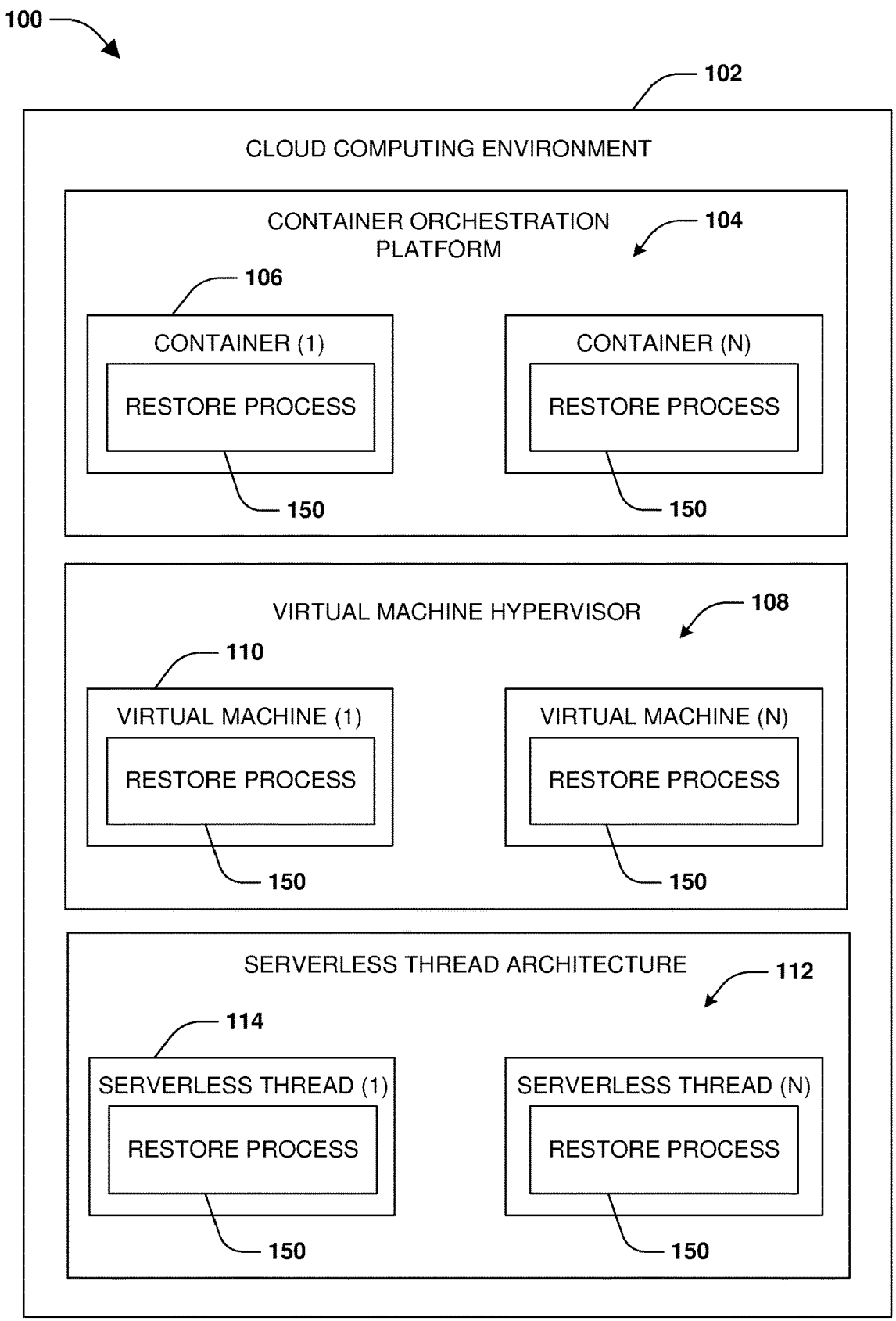
FIG. 1 is a block diagram illustrating an example cloud computing environment in which an embodiment of the present technology may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A client stores data within a volume that is managed by a node. The volume is stored within local storage, such as on-premise storage, that is accessible to the node. The node provides the client with backup functionality for backing up the volume, restore functionality for restoring the volume back to a prior state, and/or other storage functionality. For example, the node creates snapshots of the volume as point-in-time representations of the volume. A snapshot is used to restore the volume back to a prior state of the volume captured by the snapshot. Because a large number of snapshots are created over time, the snapshots consume a substantial amount of costly local storage. Accordingly, the node may store the snapshots through a remote object store, such as a cloud computing environment, within relatively cheaper storage compared to the local storage. In an example, backup data of the snapshots are stored as objects within the remote object store. The remote object store provides relatively low cost storage that is highly scalable for long term storage of snapshots.

In some embodiments, the remote object store is a storage environment of a cloud computing environment hosted by a $3^{rd}$ party cloud storage provider (e.g., AWS, Azure, etc.). The storage environment comprises storage buckets within which objects are stored. These objects are created by the node to comprise snapshot data of snapshots being backed up to the storage environment. The node transmits these objects to an endpoint of the remote object store for storage within that endpoint (e.g., within a storage bucket of the endpoint). The storage environment is comprised of storage devices hosted and maintained by the $3^{rd}$ party cloud storage provider. The storage environment is accessible to client devices, such as the node, over a network. An endpoint of the storage environment has a frontend with which the client devices interact. The frontend is configured to receive API calls transmitted by the node to the storage environment.

The API calls correspond to various processing and functionality that the node is requesting from the storage environment to perform, such as storing objects within the storage environment. In this way, the $3^{rd}$ party cloud storage provider provides the node with storage through storage buckets of the storage environment as the remote object store accessible through API calls transmitted over a network from client devices to the frontend of the storage environment. The $3^{rd}$ party cloud storage provider also provides compute, such as processor and memory resource, which is assigned to clients for use in hosting applications, websites, and services within virtual machines, containers, etc.

When a client requests to restore the volume using one of the snapshots stored within the remote object store, a restore process is initiated. Depending on the amount of backup data that is to be retrieved over a network from the remote object store, the restore process could take several hours. Unfortunately, the data being restored is unavailable to the client until the entire restore process is complete. That is, until the restore process fully completes, the client is unable to access already restored data and is unable to access data yet to be restored. This can result in the client being unable to access data for hours. Any applications that will use this data are unable to run until the restore process is fully complete, which can result in hours of application downtime and/or can cause applications to timeout.

An on-demand restore process is implemented to restore backup data of a snapshot to an on-demand volume. The on-demand restore process is implemented by a device such as a node, a virtual machine, a container (e.g., a Kubernete container), through a Quark pod, a cloud computing environment, a server, an on-premise device, software, hardware, or a combination thereof. The on-demand restore process is implemented such that the client is provided with access to the on-demand volume before the on-demand restore process has completed. During the on-demand restore process where backup data of the snapshot is retrieved from the remote object store and is restored to the on-demand volume, the client is provided with access to already restored backup data and backup data not yet restored by the on-demand restore process.

In some embodiments of implementing the on-demand restore process, metadata of the snapshot is retrieved from the remote object store and stored within the local storage. Once the metadata has been retrieved from the remote object store and stored within the local storage, the client is provided with access to the on-demand volume while the on-demand restore process is restoring backup data from the snapshot to the on-demand volume within the local storage. When the client requests access to a block of the backup data during the on-demand restore process, the metadata can be used to determine whether the block has already been restored to the on-demand volume or has yet to be restored to the on-demand volume. If the block has already been restored to the on-demand volume, then the client is provided with access to the block stored within the local storage. Because the block is not retrieved over the network from the remote object store, the client is provided with low latency access to the block stored within the local storage. If the block has not yet been restored to the on-demand volume, then the block is retrieved over the network from the snapshot within the remote object store, and is provided to the client. In this way, the client may access already restored data and not yet restored data during the on-demand restore process.

A cloud block map is used to provide the client with access to backup data of a file being restored in a manner that does not affect the integrity of the file. When a determination is made that the client is requesting access to a block of backup data not yet restored by the restore process, the block is retrieved from the snapshot in the remote object store. The block is cached as a cached block within the cloud block map stored within the local storage of the device. In this way, the client is provided with access to the cached block within the cloud block map. Any modifications to the cached block within the cloud block map does not affect or modify the file being restored by the restore process. This preserves the integrity of the file that is being restored to the state captured in the snapshot, which would not be the case if the file was overwritten by the subsequent modifications by the client. The client may subsequently access the cached block of backup data within the cloud block map stored in the local storage at a lower latency than if the subsequent access had to re-retrieve the backup data over the network from the remote object store. In this way, blocks of not yet restored backup data are cached within the cloud block map in order to reduce latency experienced by the client when accessing the backup data not yet restored by the restore process. This is achieved because the cloud block map is stored within the local storage that provides lower latency than accessing the backup data over the network from the remote object store.

The cloud block map is managed in an efficient manner so that the cloud block map does not grow indefinitely or consume more storage space than necessary. In particular, temperature metrics are tracked for cached blocks within the cloud block map. A temperature metric for a cached block is derived from a last time that the cached block was accessed. Thus, the temperature metric is indicative of how recently and/or frequently the cached block was accessed. An eviction scanner is executed to evaluate the temperature metrics of the cached blocks to determine whether to evict or retain the cached blocks within the cloud block map. In response to the eviction scanner determining that the temperature metric is above a threshold (e.g., the cached block was recently accessed), the cached block is retained in the cloud block map. In response to the eviction scanner determining that the temperature metric is below a threshold (e.g., the cached block has not been recently accessed), the cached block is evicted from the cloud block map.

In some embodiments, serverless on-demand disaster recovery is implemented for volumes and/or virtual machines. Existing disaster recovery techniques actively/physically maintain a secondary node (e.g., maintained in standby mode or an active mode where the secondary node serves client I/O) during normal operation of a primary node while the primary node is providing clients with access to a primary volume. Because these existing disaster recovery techniques maintain the secondary node during normal operation of the primary node, the secondary node is ready and available to take over for the primary node if the primary node fails. Unfortunately, maintaining the secondary node during normal operation of the primary node consumes computing resources such as processor and storage resources that are wasted in maintaining the secondary node.

Accordingly, as provided herein, serverless on-demand disaster recovery is provided for volumes and/or virtual machines in a manner that conserves computing resources compared to existing disaster recovery techniques. In particular, a primary node hosts a primary volume being accessed by clients. While the primary node is hosting the primary volume during normal operation, there is no secondary node and/or secondary volume being maintained.

This conserves computing resources that would be wasted by otherwise hosting the secondary node and/or the secondary volume while clients are able to access the primary volume through the primary node. During the normal operation of the primary node, snapshots of the primary volume are generated over time. The snapshots are stored to an object store as objects comprising snapshot data (backup data) of the snapshots. These objects are formatted according to an object format tailored for the object store so that the snapshot data (backup data) of particular snapshots can be identified and retrieved from objects storing such data.

In response to the primary node and/or primary volume failing, a secondary node and/or an on-demand volume are created on-demand. That is, the secondary node and/or the on-demand volume may not exist during normal operation of the primary node, and creation of the secondary node and/or the on-demand volume is triggered in response to the failure of the primary node. In some embodiments, a container, a virtual machine, a node of a clustered network environment (e.g., worker node of a container orchestration platform such as kubernetes), or other compute and/or storage is dynamically created and allocated on-demand for hosting the secondary node and/or the on-demand volume in response to the primary node failing.

A restore process is initiated to restore the on-demand volume to a state of the primary volume captured by one or more snapshots stored within the object store. Once certain metadata in the snapshot has been restored (e.g., a superblock, an inofile, a directory file, or other root metadata of a file system), the secondary node provides clients with access to the on-demand volume while the restore process is restoring snapshot data (backup data) of the one or more snapshots to the on-demand volume by retrieving such data from objects stored within the object store. A cloud block map is used to cached blocks retrieved on-demand from the snapshot that are requested by clients (e.g., targeted by a read or write operation from a client) but have not yet been restored to the on-demand volume. These cached blocks are quickly and efficiently accessed by clients through the cloud block map because the cached blocks no longer need to be retrieved over a network from the object store.

As the clients make modifications to the on-demand volume (e.g., modify cached blocks tracked by the cloud block map), the modifications are incrementally backed up to the object store as on-demand volume snapshots. These on-demand volume snapshots are incremental and merely capture the modifications made through the secondary node by clients. This makes the incremental backup efficient and reduces network bandwidth because already restored and unmodified data in the on-demand volume is not being re-backed up to the object store. When the primary node and primary volume has recovered from the failure, the on-demand volume snapshots are used to incrementally restore the primary volume to a state of the on-demand volume. Once a delta (difference) between the primary volume and the on-demand volume is less than a threshold, a final update and/or incremental transfer is performed while applications accessing the on-demand volume are quiesced so that the primary volume mirrors the on-demand volume. Once the primary volume mirrors the on-demand volume, the clients are failover from accessing the secondary node to accessing the primary node and primary volume. The secondary node and/or secondary volume is destroyed in order to conserve computing resources. Once a rel state metafile (e.g., a metafile used to consistently track a copy of metadata of an object file system, such as root objects 1012, 1014 and snapinfo objects 1016 of object file system 1024 of FIG. 10B, stored within the remote object store) and/or a metafile (e.g., a VMAP) are rebuilt, incremental backups of the primary volume to the object store may resume. In some embodiments, this serverless on-demand disaster recovery is implemented for virtual machines.

Various embodiments of the present technology provide for a wide range of technical effects, advantages, and/or improvements to computing systems and components. For example, various embodiments may include one or more of the following technical effects, advantages, and/or improvements: 1) backing up snapshots of a volume within local storage to a remote object store that provides low cost long term scalable storage 2) restoring a snapshot from the remote object store on-demand to an on-demand volume within local storage that provides the client with low latency access to data within the on-demand volume, 3) providing a client with access to the on-demand volume during the restore operation while backup data is being restored from the snapshot to the on-demand volume so that the client does not have to wait for the entire restore operation to fully complete before being able to access backup data, which can take hours or longer, 4) providing, during the restore process, the client with low latency access to already restored data in the local storage, 5) providing, during the restore process, the client with access to not yet restored data from the snapshot in the remote object store, 6) caching not yet restored blocks within a cloud block map stored within local storage that provides clients with low latency access to the cached blocks, 7) a temperature tracking technique for identifying cached blocks that have not been recently access, 8) an eviction scanner for evicting the cached blocks that have not been recently accessed in order to reduce storage consumed by the cloud block map; 9) creating a secondary node and/or on-demand volume on-demand in response to a failure of a primary node so that the secondary node can take over for the failed primary node by providing clients with access to the on-demand volume; 10) creating the secondary node and/or on-demand volume on-demand in response to the failure of the primary node so that computing resources are not wasted by otherwise maintaining the secondary node and/or on-demand volume during normal operation of the primary node; 11) incrementally backing up modifications made to the on-demand volume to the object store as on-demand volume snapshots for subsequent restoration of the primary volume using the on-demand volume snapshots; 12) incrementally restoring the primary volume using the on-demand volume snapshots to mirror the on-demand volume; and/or 13) providing serverless on-demand disaster recovery for virtual machines.

FIG. 1 illustrates an example of a cloud computing environment 102 within which the techniques described herein can be implemented. In some embodiments, a restore process 150 is implemented by the cloud computing environment 102 to perform on-demand restore of a snapshot to an on-demand volume accessible to clients, on-demand serverless disaster recovery, and/or other techniques described herein. The cloud computing environment 102 comprises servers, processors, memory, storage devices, and/or other resources that can be used by various types of environments for hosting instances of the restore process 150, such as a container orchestration platform 104, a virtual machine hypervisor 108, a serverless thread architecture 112, etc.

In some embodiments, the cloud computing environment 102 hosts instances of the restore process 150 within containers. In particular, the cloud computing environment 102 comprises the container orchestration platform 104, such as a Kubernetes environment. The container orchestration platform 104 creates containers such as a first container 106 for hosting instances of the restore process 150. The container orchestration platform assigns compute resources (e.g., CPU and memory resources) and storage resources to the first container 106. The first container 106 executes programming code of the restore process 150 using the assigned compute resources and storage resources. In this way, any number of instances of the restore process 150 are implemented through the container orchestration platform 104 by the cloud computing environment 102.

In some embodiments, the cloud computing environment 102 hosts instances of the restore process 150 within virtual machines. In particular, the cloud computing environment 102 comprises the virtual machine hypervisor 108. The virtual machine hypervisor 108 is configured to create and host virtual machines within the cloud computing environment 102. The virtual machine hypervisor 108 creates a first virtual machine 110 that executes programming code of the restore process 150 using resources of the cloud computing environment 102 provided by the virtual machine hypervisor 108 to the first virtual machine 110. The virtual machine hypervisor 108 can create and host any number of virtual machines for hosting instances of the restore process 150.

In some embodiments, the cloud computing environment 102 executes the programming code of the restore process 150 using serverless threads of a serverless thread architecture 112. A serverless thread is a thread of execution that is not tied to a particular server or other hardware, and can be executed using resources of the cloud computing environment 102 assigned to the serverless thread by the serverless thread architecture 112. In this way, any number of serverless threads, such as a first serverless thread 114, can be created on demand for executing the programming code of the restore process 150.

Figure 2:
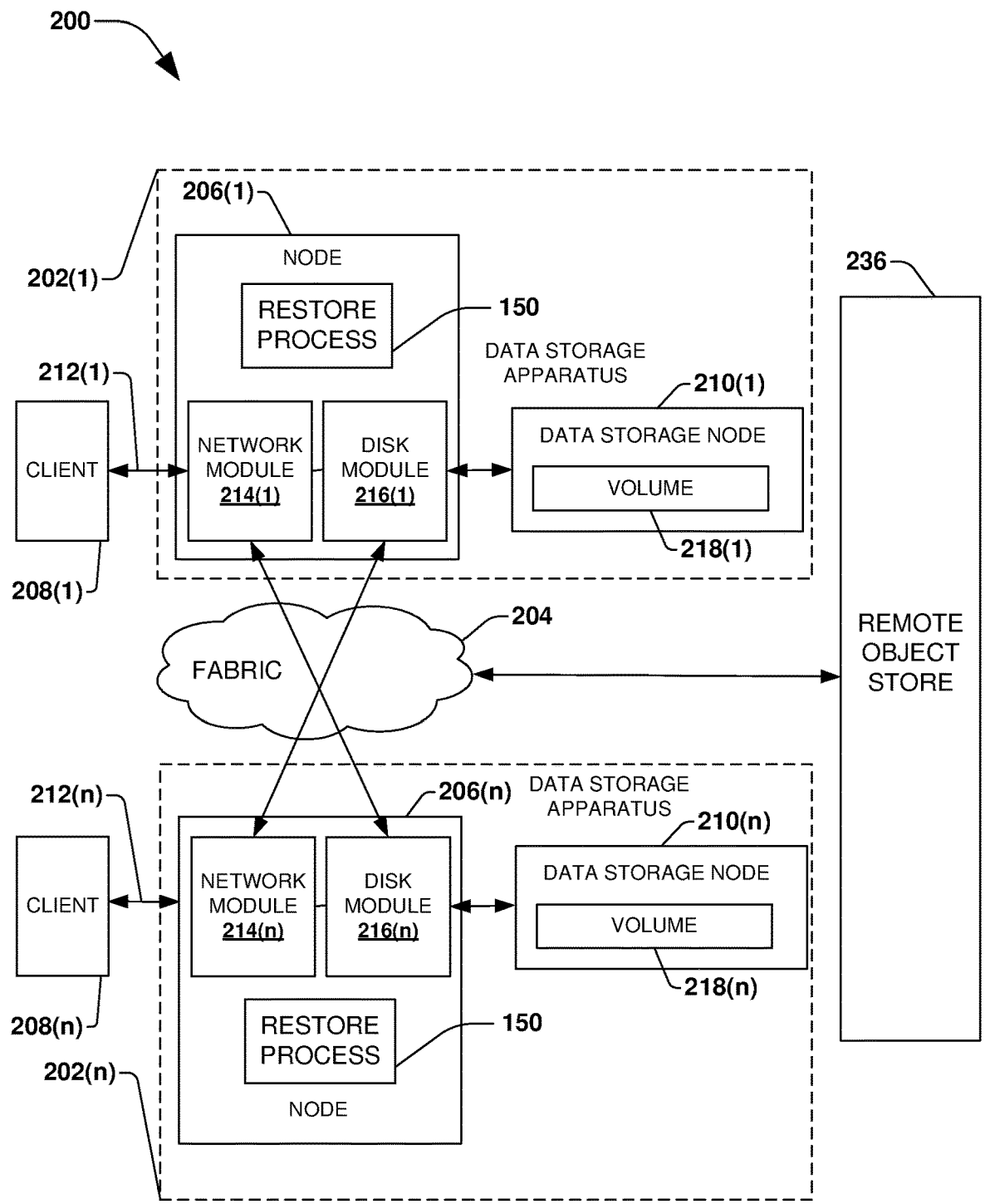
FIG. 2 is a block diagram illustrating a network environment with exemplary nodes.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, nodes 206(1)-206(n), for example), although any number of other elements or components can also be included in the clustered network environment 200 in other examples. This technology provides a number of advantages including methods, non-transitory computer readable media, and computing devices that implement the techniques described herein.

In some embodiments, the nodes 206(1)-206(n) may be configured to implement the techniques described herein. The nodes 206(1)-206(n) may host the restore process 150 that is configured to perform on-demand restore of a snapshot to an on-demand volume accessible to clients, on-demand serverless disaster recovery, and/or other techniques described herein.

In this example, nodes 206(1)-206(n) can be primary or local storage controllers or secondary or remote storage controllers that provide client devices 208(1)-208(n) with access to data stored within data storage devices 210(1)-210(n) and cloud storage device(s) of a remote object store 236 (also referred to as cloud storage node(s)). The nodes 206(1)-206(n) may be implemented as hardware, software (e.g., a storage virtual machine), or combination thereof.

The data storage apparatuses 202(1)-202(n) and/or nodes 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Internet Small Computer System Interface (iSCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The nodes 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) of the remote object store 236), etc., for example. Such nodes 206(1)-206(n) can be attached to the cluster fabric 204 at a connection point, redistribution point, or communication endpoint, for example. One or more of the nodes 206(1)-206(n) may be capable of sending, receiving, and/or forwarding information over a network communications channel, and could comprise any type of device that meets any or all of these criteria.

In an example, the nodes 206(1) and 206(n) may be configured according to a disaster recovery configuration whereby a surviving node provides switchover access to the storage devices 210(1)-210(n) in the event a disaster occurs at a disaster storage site (e.g., the node 206(1) provides client device 212(n) with switchover data access to data storage devices 210(n) in the event a disaster occurs at the second storage site). In other examples, the node 206(n) can be configured according to an archival configuration and/or the nodes 206(1)-206(n) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(n) can include various functional components that coordinate to provide a distributed storage architecture. For example, the nodes 206(1)-206(n) can include network modules 214(1)-214(n) and disk modules 216(1)-216(n). Network modules 214(1)-214(n) can be configured to allow the nodes 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node 206(1) can access the data storage device 210(n) by sending a request via the cluster fabric 204 through the disk module 216(n) of node 206(n) when the node 206(n) is available. Alternatively, when the node 206(n) fails, the network module 214(1) of node 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the nodes 206(1)-206(n). Often, disk modules 216(1)-216(n) communicate with the data storage devices 210(1)-210(n) according to the SAN protocol, such as iSCSI or FCP, for example, although other protocols can also be used. Thus, as seen from an operating system on nodes 206(1)-206(n), the data storage devices 210(1)-210(n) can appear as locally attached. In this manner, different nodes 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 208(1)-208(n) can be networked with the nodes 206(1)-206(n) in the cluster, over the storage connections 212(1)-212(n). As an example, respective client devices 208(1)-208(n) that are networked to a cluster may request services (e.g., exchanging of information in the form of data packets) of nodes 206(1)-206(n) in the cluster, and the nodes 206(1)-206(n) can return results of the requested services to the client devices 208(1)-208(n). In one example, the client devices 208(1)-208(n) can exchange information with the network modules 214(1)-214(n) residing in the nodes 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) of the remote object store 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., iSCSI target address). To represent respective volumes, a target address on the data storage devices 210(1)-210(n) can be used to identify one or more of the LUNs. Thus, for example, when one of the nodes 206(1)-206(n) connects to a volume, a connection between the one of the nodes 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
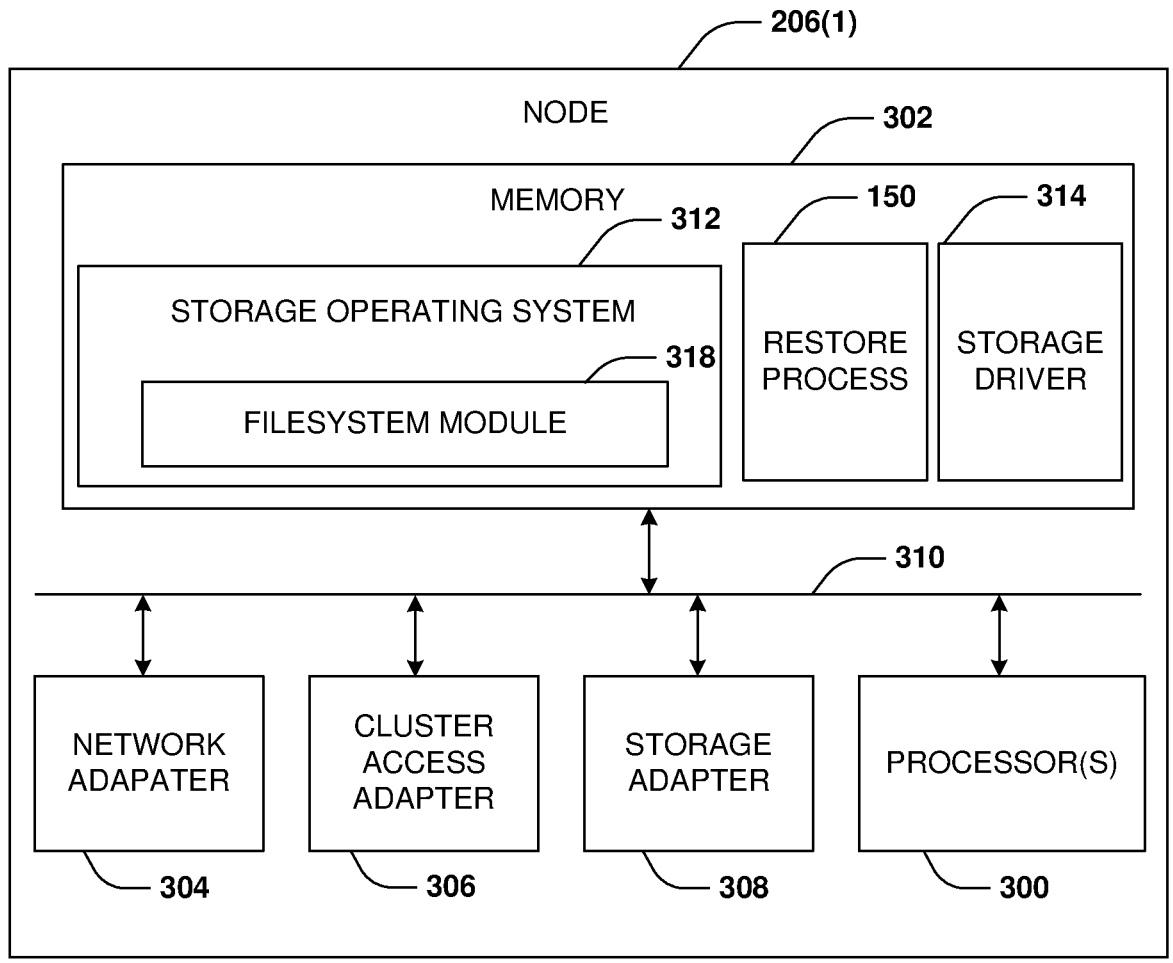
FIG. 3 is a block diagram illustrating an exemplary node.

Referring to FIG. 3, node 206(1) in this particular example includes processor(s) 300, a memory 302, a network adapter 304, a cluster access adapter 306, and a storage adapter 308 interconnected by a system bus 310. In other examples, the node 206(1) comprises a virtual machine, such as a virtual storage machine. The node 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node 206(n) is substantially the same in structure and/or operation as node 206(1), although the node 206(n) can also include a different structure and/or operation in one or more aspects than the node 206(1).

In some embodiments, programming code of the restore process 150 may be stored within the memory of the node 206(1) and may be executed by the processors(s) 300 to perform on-demand restore of a snapshot to an on-demand volume accessible to clients, on-demand serverless disaster recovery, and/or other techniques described herein.

The network adapter 304 in this example includes the mechanical, electrical and signaling circuitry needed to connect the node 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) of the remote object store 236 to process storage operations associated with data stored thereon.

The storage adapter 308 cooperates with the storage operating system 312 executing on the node 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node in the cluster) where the information is formatted into a data packet and returned to a requesting one of the client devices 208(1)-208(n) and/or sent to another node attached via the cluster fabric 204. In some examples, a storage driver 314 in the memory 302 interfaces with the storage adapter to facilitate interactions with the data storage devices 210(1)-210(n).

The storage operating system 312 can also manage communications for the node 206(1) among other devices that may be in a clustered network, such as attached to a cluster fabric 204. Thus, the node 206(1) can respond to client device requests to manage data on one of the data storage devices 210(1)-210(n) or cloud storage device(s) of the remote object store 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4A:
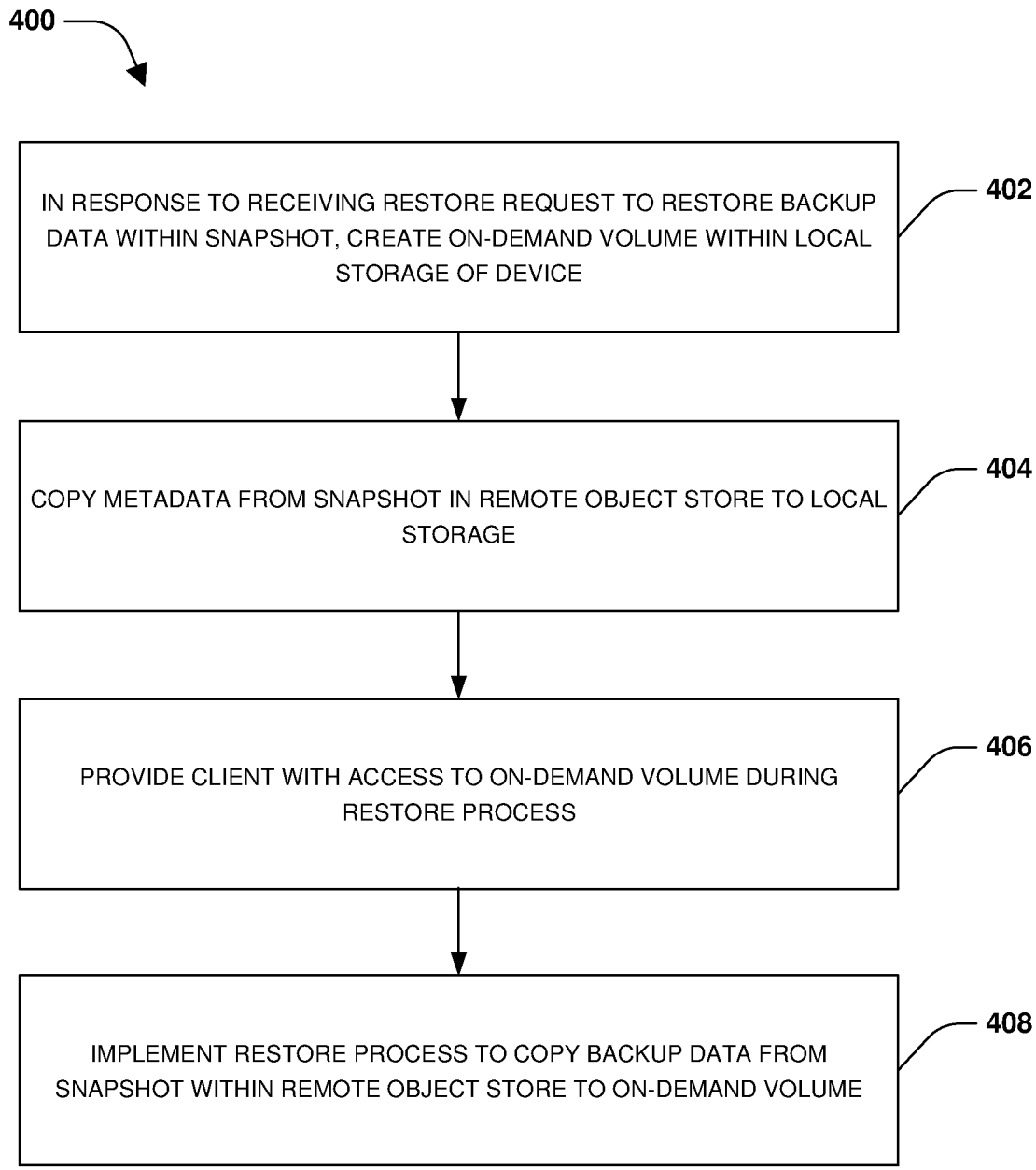
FIG. 4A is a flow chart illustrating an example method for on-demand restore of a snapshot to an on-demand volume accessible to clients.

One embodiment of on-demand restore of a snapshot to an on-demand volume accessible to clients is illustrated by an exemplary method 400 of FIG. 4A, which is further described in conjunction with system 500 of FIGS. 5A-5E.

Figure 5A:
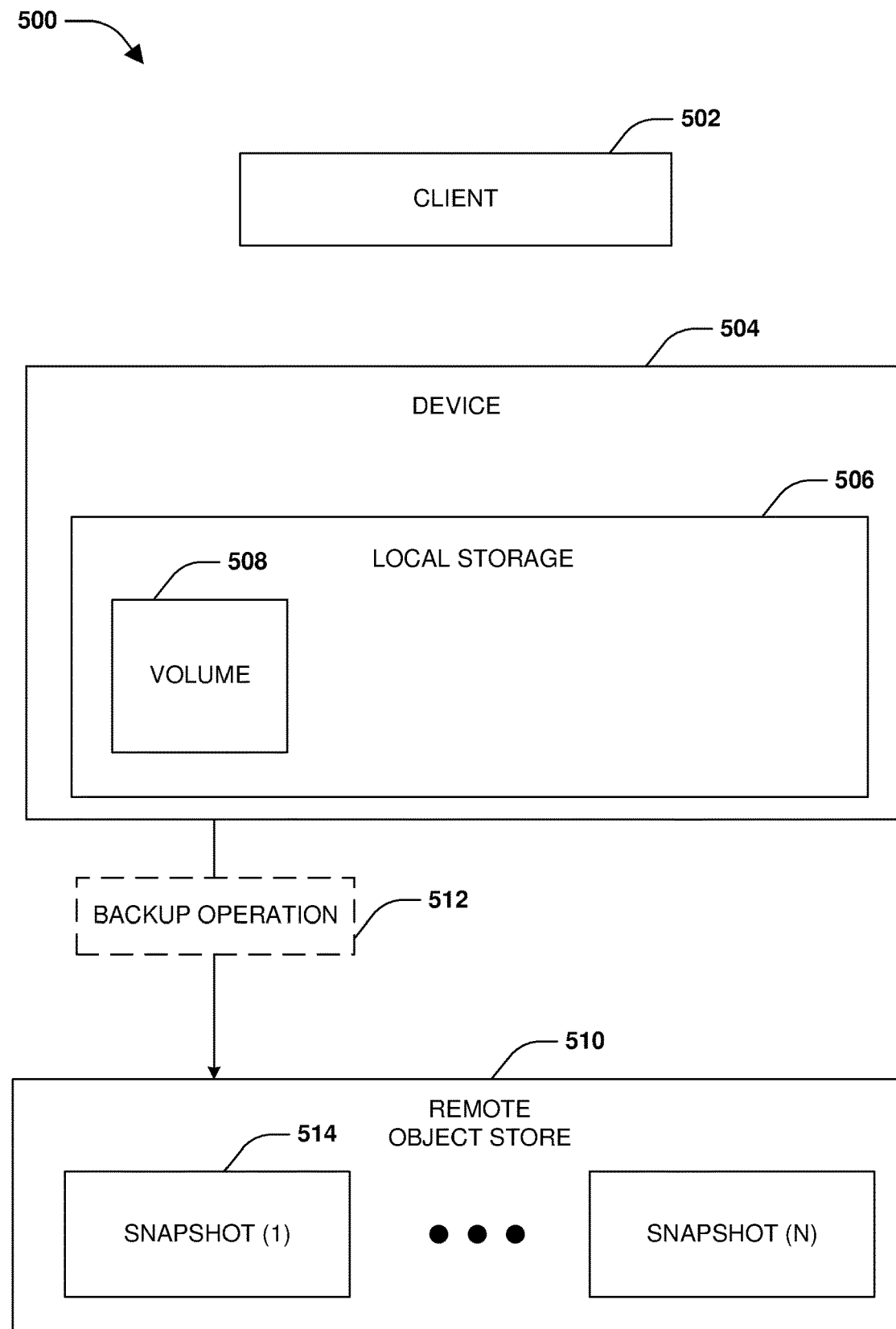
FIG. 5A is a block diagram illustrating an example system for on-demand restore of a snapshot to an on-demand volume accessible to clients, where a backup operation is performed.

A device 504 stores data on behalf of a client 502 within local storage 506, as illustrated by FIG. 5A. It may be appreciated that the device 504, configured to perform the on-demand restore, is implemented as a node, a virtual machine, a container (e.g., a Kubernete container), through a Quark pod, a cloud computing environment, a server, an on-premise device, software, hardware, or a combination thereof. In an example, the device 504 may provide the client 502 with access to a volume 508 stored within the local storage 506. The device 504 provides storage management functionality that can be used to provide backup, restore, and/or other storage functions. In an example, the device 504 may execute snapshot functionality in order to create snapshots of the volume 508 as point-in-time representations of the volume 508.

Storing the snapshots within the local storage 506 may become expensive over time. Accordingly, the device 504 implements a backup operation 512 to store the snapshots within a remote object store 510, such as a cloud computing environment, that provides relatively lower cost scalable long term storage compared to the local storage 506. For example, the backup operation 512 is implemented to transmit a first snapshot 514 of the volume 508 from the device 504 over a network to the remote object store 510. In some embodiments, the backup operation 512 is implemented to create a snapshot, and then transmit the snapshot from the local storage 506 to storage of the remote object store 510. In some embodiments, the backup operation 512 is implemented to transfer an existing snapshot from the local storage 506 of the device 504 to the remote object store 510. In this way, any number of snapshots are stored within the remote object store 510, such as within objects according to an object format.

Figure 5B:
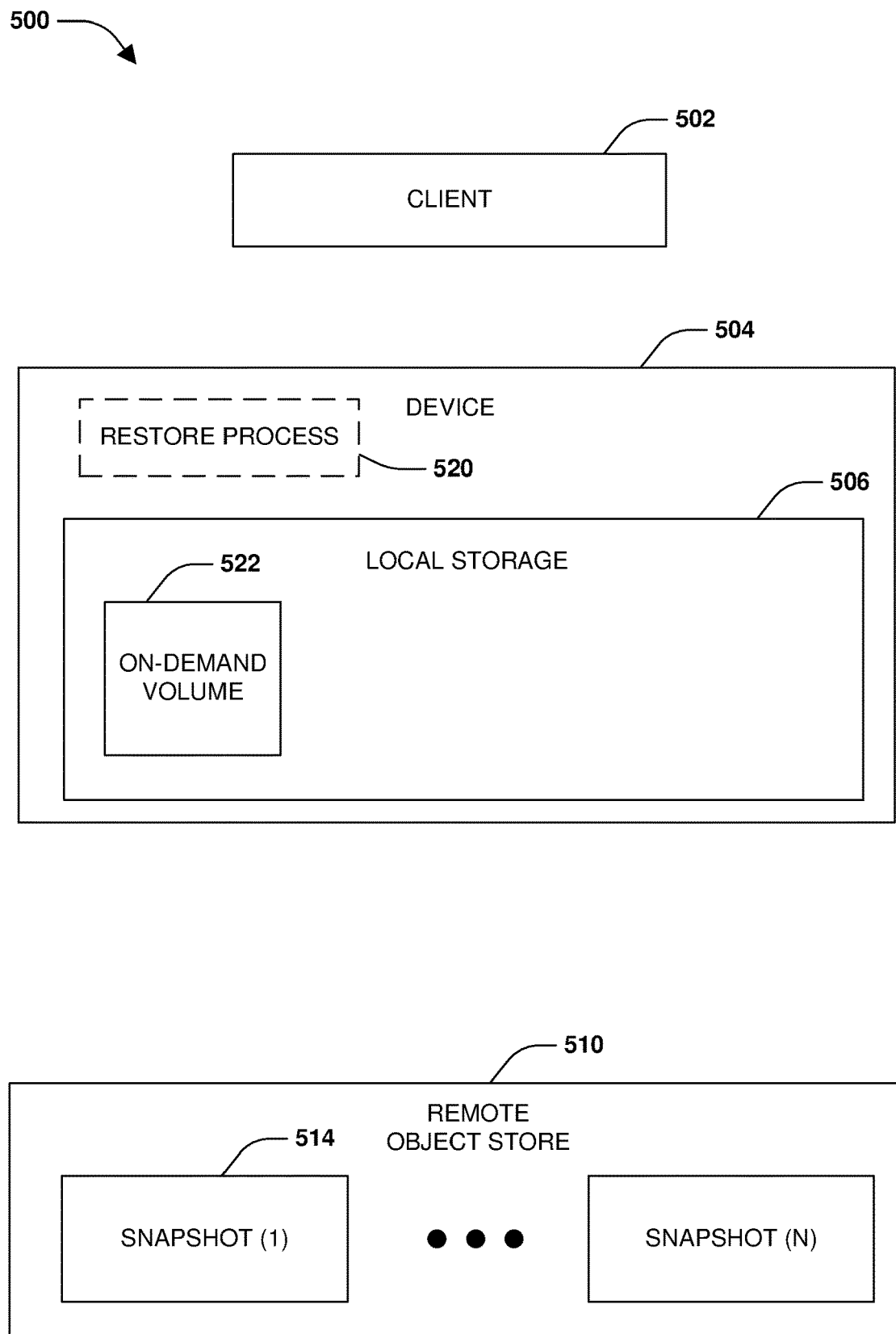
FIG. 5B is a block diagram illustrating an example system for on-demand restore of a snapshot to an on-demand volume accessible to clients, where a restore process is initiated.

The device 504 may receive a restore request to restore the volume 508 back to a state captured by a snapshot such as the first snapshot 514. In an example, the device 504 may receive the request from the client 502. The request specifies the first snapshot 514 that is to be used to perform a restore process 520 (an on-demand restore operation) to restore the volume 508 back to the prior state captured by the first snapshot 514. During operation 402 of method 400 of FIG. 4A, in response to receiving the restore request to restore backup data within the first snapshot 514 stored within the remote object store 510 (e.g., a request received by a client to restore the backup data), an on-demand volume 522 is created within the local storage 506 of the device 504, as illustrated by FIG. 5B. The on-demand volume 522 initially is an empty volume into which the restore process 520 (the on-demand restore operation) will restore the backup data from the first snapshot 514 within the remote object store 510. Unlike a traditional volume where all client requests for data are processed through a file system of the traditional volume using data stored within the traditional volume, client access to the on-demand volume 522 can result in either retrieving already restored data from the on-demand volume 522 or an on-demand retrieval of not yet restored data from the first snapshot 514 within the remote object store 510.

Figure 5C:
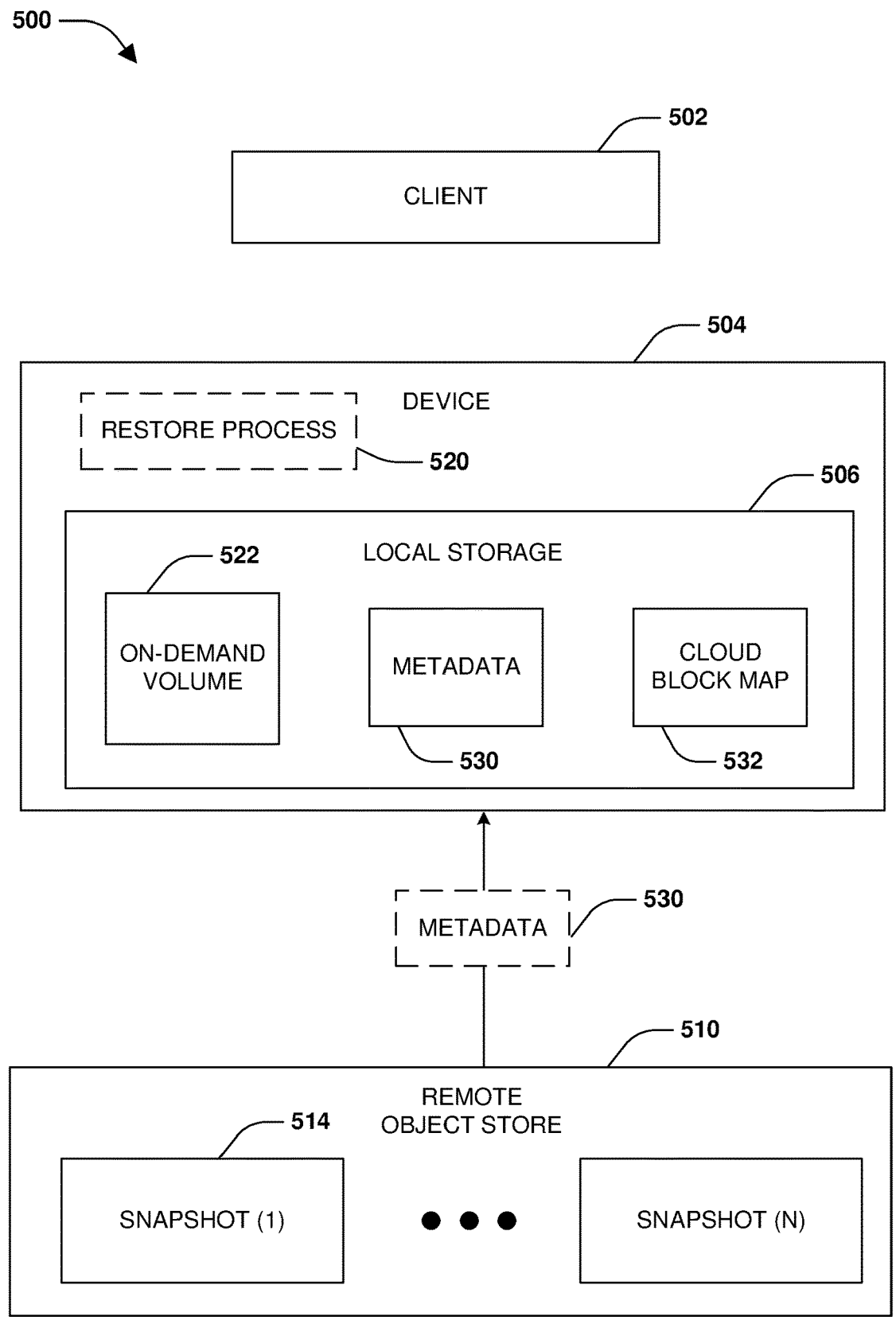
FIG. 5C is a block diagram illustrating an example system for on-demand restore of a snapshot to an on-demand volume accessible to clients, where metadata of a snapshot is copied to local storage.

As part of initializing the restore process 520, metadata 530 of the first snapshot 514 is retrieved from the remote object store 510, during operation 404 of method 400 of FIG. 4A. The metadata 530 is stored within the local storage 506 of the device 504, as illustrated by FIG. 5C. The metadata 530 is retrieved before backup data of the first snapshot 514 is restored from the remote object store 510 to the on-demand volume 522 within the local storage 506 of the device 504.

The metadata 530 identifies blocks comprising the backup data of the first snapshot 514. In an embodiment, the metadata 530 corresponds to a tree structure, such as a buftree, comprising one or more levels of indirect blocks (pointers) that is traversed from a root of the tree structure down through the tree structure to a bottom level of direct blocks corresponding to actual data. The metadata 530 (e.g., a level of indirect blocks that point to the bottom level of direct blocks) comprises virtual volume block number entries mapped to physical volume block number entries. For example, a block of backup data within the first snapshot 514 is associated with a virtual volume block number entry that is mapped to a physical volume block number entry. If the block has not yet been restored from the first snapshot 514 to the on-demand volume 522, then the virtual volume block number entry is populated with a cloud block number of the block. The cloud block number corresponds to a location of the block stored within the remote object store 510, and thus is used to locate and retrieve the block from the remote object store 510. Also, if the block has not yet been restored from the first snapshot 514 to the on-demand volume 522, then the physical volume block number entry is populated with an absent indicator to indicate that backup data of the block has not yet been restored to the on-demand volume 522 and stored within the local storage 506 of the device 504.

If the block has been restored from the first snapshot 514 to the on-demand volume 522, then the virtual volume block number entry is populated with a virtual volume block number of the block within the on-demand volume 522. Also, if the block has been restored from the first snapshot 514 to the on-demand volume 522, then the physical volume block number entry is populated with a physical volume block number used to locate a storage location of the block within the local storage 506. In this way, the metadata 530 can be evaluated to determine whether a block has been restored to the on-demand volume 522 by the restore process 520 or has not yet been restored to the on-demand volume 522 by the restore process 520.

Figure 5D:
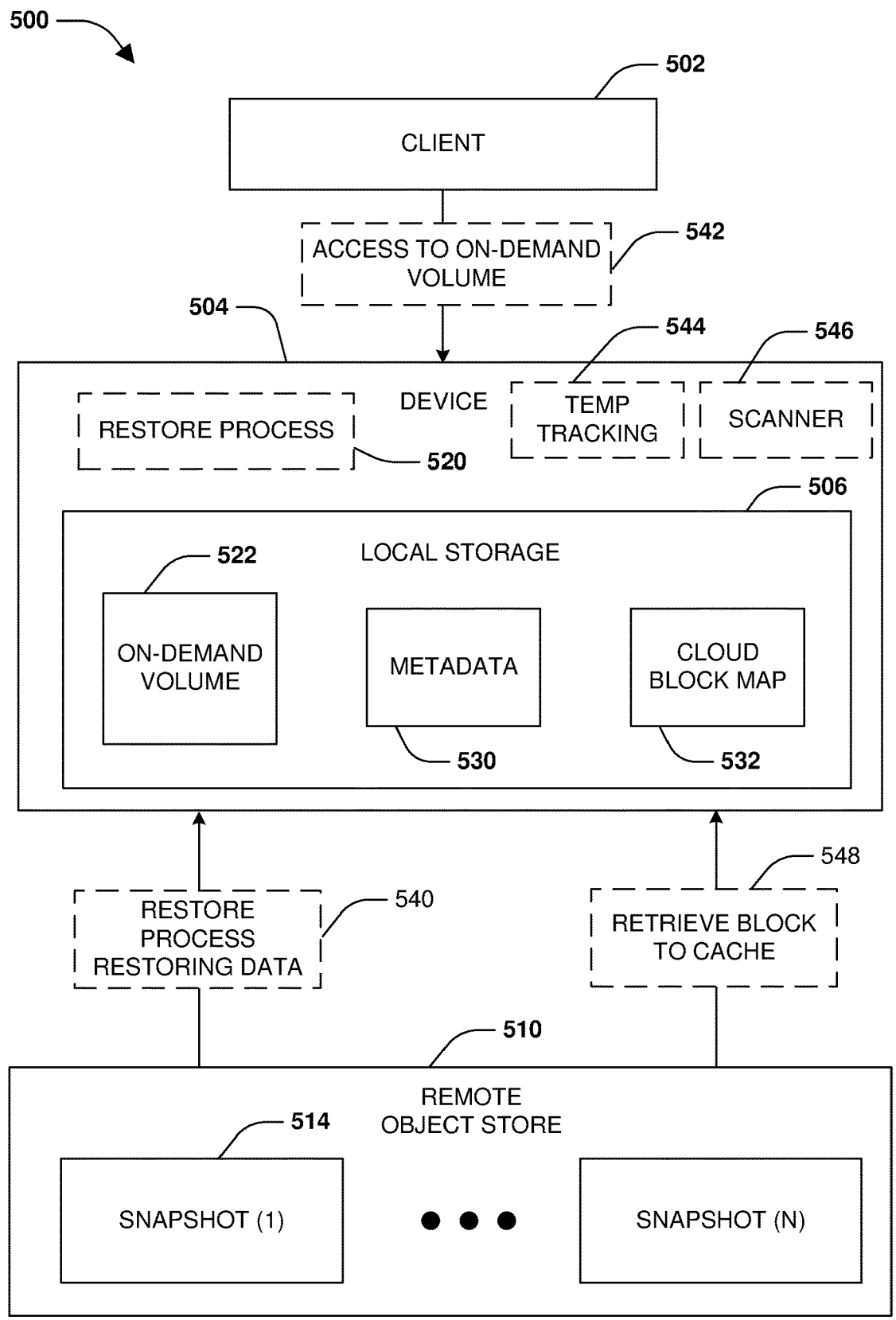
FIG. 5D is a block diagram illustrating an example system for on-demand restore of a snapshot to an on-demand volume accessible to clients, where a client is provided with access to the on-demand volume while a restore process is being executed.

During operation 406 of method 400 of FIG. 4A, the client 502 is provided with access 542 to the on-demand volume 522 during the restore process 520 restoring 540 the backup data from the first snapshot 514 within the remote object store 510 to the on-demand volume 522 for storage within the local storage 506, as illustrated by FIG. 5D. In some embodiments, the client 502 is provided with the access 542 to the on-demand volume 522 during the restore process 520 once the metadata 530 has been copied from the remote object store 510 to the local storage 506. During operation 408 of method 400 of FIG. 4A, the restore process 520 is implemented to restore 540 the backup data from the first snapshot 514 within the remote object store 510 to the on-demand volume 522 for storage within the local storage 506.

Figure 4B:
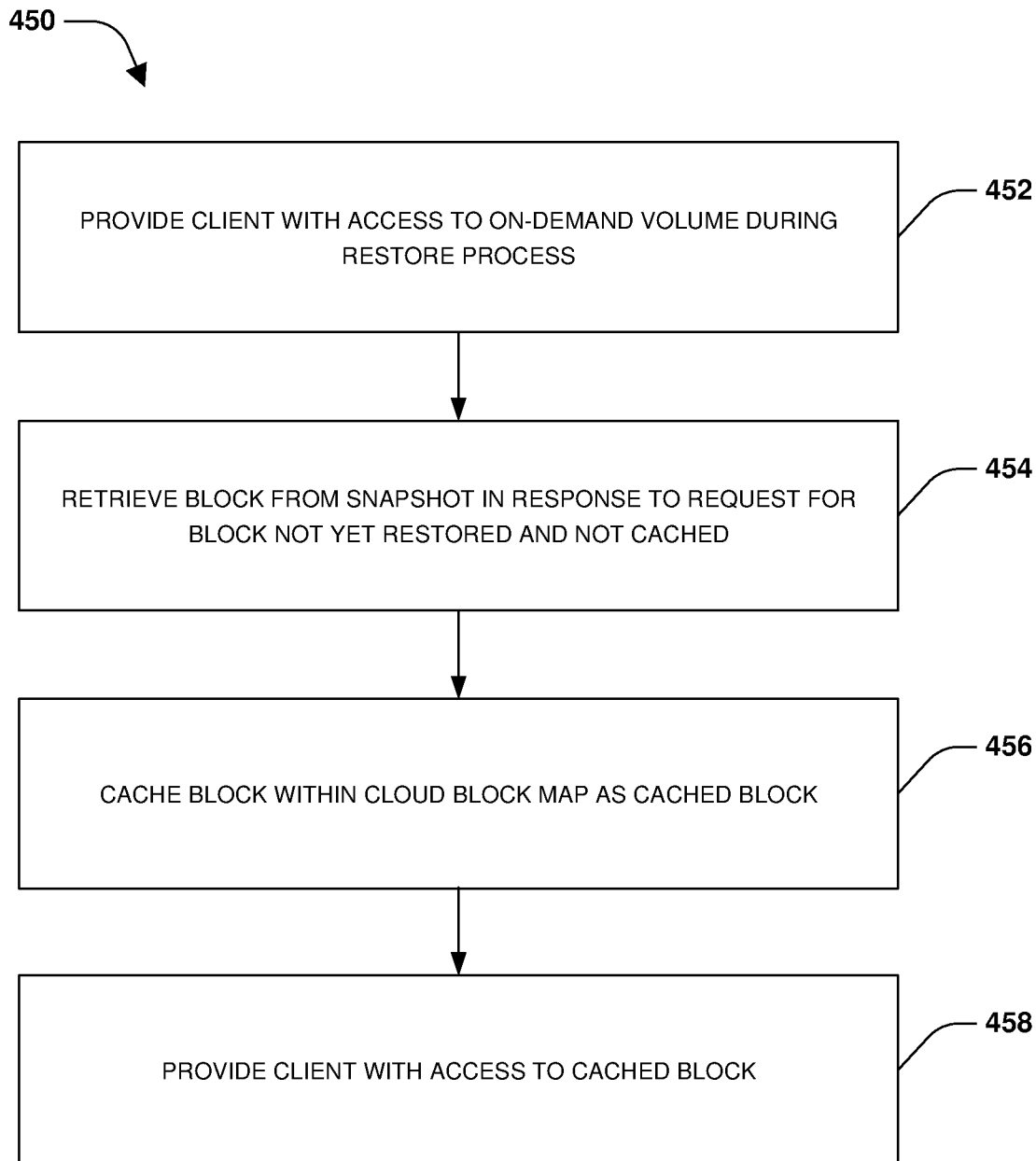
FIG. 4B is a flow chart illustrating an example method for caching data during an on-demand restore.
Figure 4C:
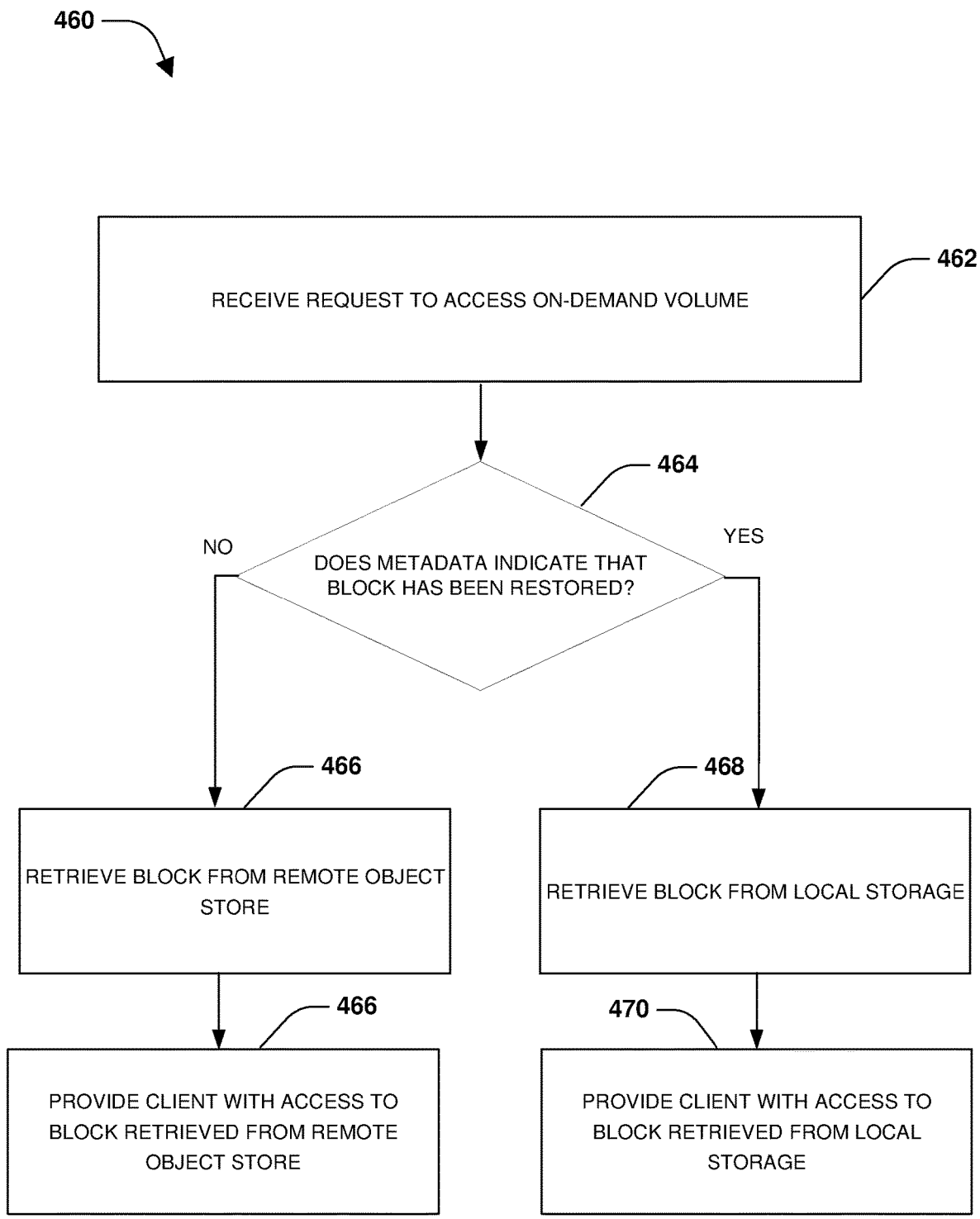
FIG. 4C is a flow chart illustrating an example method for providing client access to an on-demand volume.

In some embodiments of providing the client 502 with the access 542 to the on-demand volume 522 during the restore process 520, a request is received by the device 504 from the client 502, during operation 462 of method 460 of FIG. 4C. The request may comprise a read operation, a write operation, or other type of operation. The request targets a particular block of data that has either been restored from the first snapshot 514 within the remote object store 510 to the on-demand volume 522 by the restore process 520 or has yet to be restored from the first snapshot 514 within the remote object store 510 to the on-demand volume 522 by the restore process 520.

In response to receiving the request, the metadata 530 is evaluated to determine whether the block has been restored from the first snapshot 514 within the remote object store 510 to the on-demand volume 522 by the restore process 520 or has yet to be restored from the first snapshot 514 within the remote object store 510 to the on-demand volume 522 by the restore process 520, during operation 464 of method 460. For example, the metadata 530 is traversed (e.g., one or more levels within a buftree of a file comprising data contained with the block) to identify a virtual volume block number entry mapped to a physical volume block number entry for the block. If the virtual volume block number entry comprises a cloud block number and/or the physical volume block number entry comprises an absent indicator, then the block has not yet been restored from the first snapshot 514 to the on-demand volume 522 by the restore process 520. Accordingly, the block is retrieved, over a network connection between the device 504 and the remote object store 510, from the first snapshot 514 within the remote object store 510 using the cloud block number, and is provided to the client 502 in response to the request, during operation 466 of method 460. The block is retrieved and provided to the client 502 while the restore process 520 is restoring 540 the backup data of the first snapshot 514 within the remote object store 510 to the on-demand volume 522 in the local storage 506, during operation 468 of method 460. In this way, the client 502 is provided with access to not yet restored data within the first snapshot 514 in the remote object store 510 while the restore process 520 is restoring 540 the backup data of the first snapshot 514 to the on-demand volume 522.

If the virtual volume block number entry comprises a virtual volume block number and/or the physical volume block number entry comprises a physical volume block number, then the block has been restored from the first snapshot 514 within the remote object store 510 to the on-demand volume 522 by the restore process 520. Accordingly, the block may be retrieved from the local storage 506 through the on-demand volume 522 using the virtual volume block number and/or the physical volume block number, during operation 468 of method 460. The block is then provided to the client 502 in response to the request. The block may be retrieved and provided to the client 502 while the restore process 520 is restoring 540 the backup data of the first snapshot 514 within the remote object store 510 to the on-demand volume 522, during operation 470 of method 460. In this way, the client 502 is provided with access to already restored data through the on-demand volume 522 within the local storage 506 while the restore process 520 is restoring 540 the backup data of the first snapshot 514 within the remote object store 510 to the on-demand volume 522.

Figure 5E:
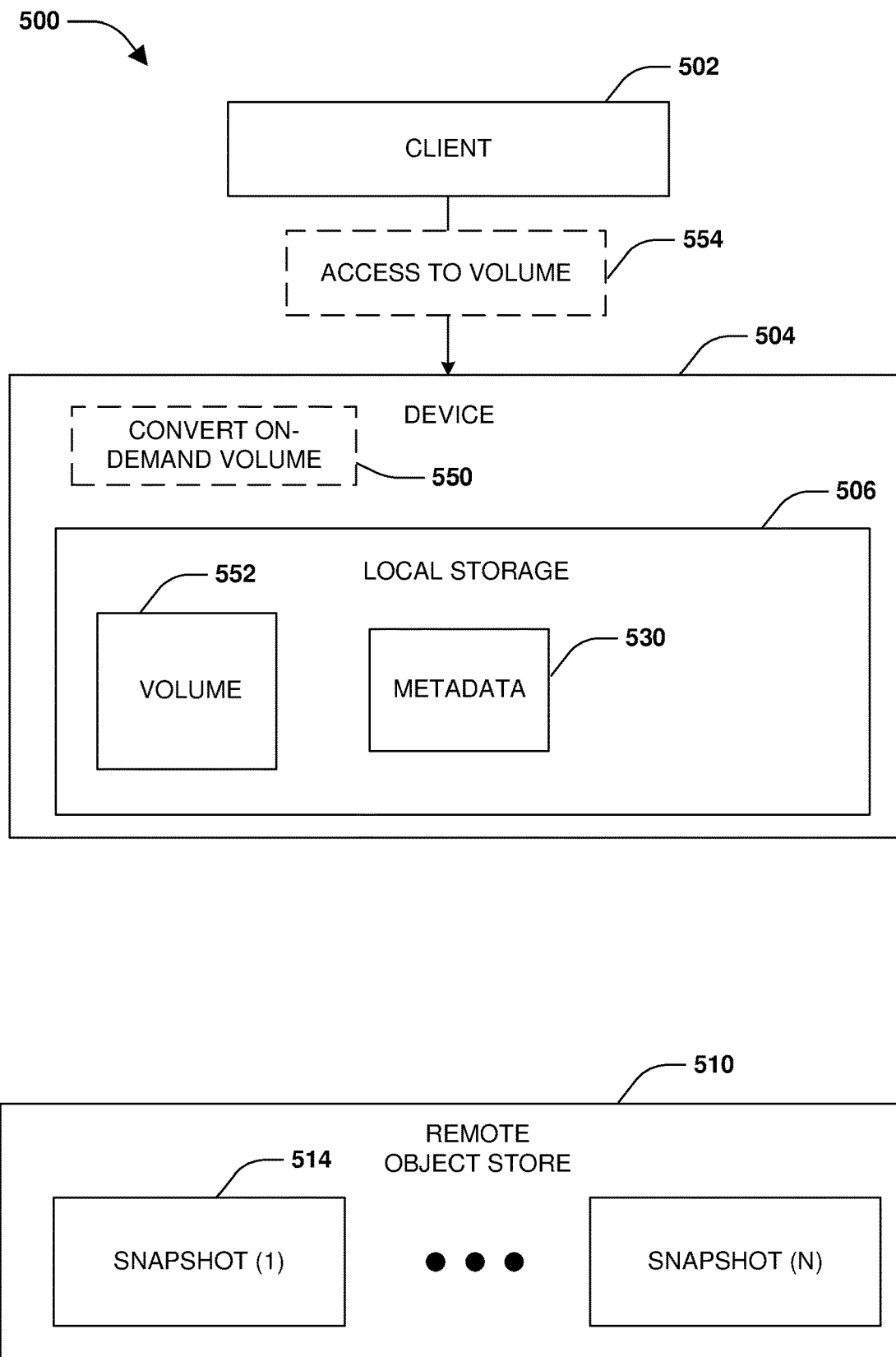
FIG. 5E is a block diagram illustrating an example system for on-demand restore of a snapshot to an on-demand volume accessible to clients, where the on-demand volume is converted to a volume.

When the restore process 520 restores the block of backup data from the first snapshot 514 within the remote object store 510 to the on-demand volume 522 within the local storage 506, the cloud block number within the virtual volume block number entry for the block is replaced with a virtual volume block number of the block within the on-demand volume 522. Also, when the restore process 520 restores the block of backup data from the first snapshot 514 within the remote object store 510 to the on-demand volume 522 within the local storage 506, the absent indicator within the physical volume block number entry for the block is replaced with a physical volume block number of the block within the local storage 506. In response to the restore process 520 completing, the on-demand volume 522 is converted 550 to a volume 552 exposed to the client 502 and/or other clients for read and write access 554 of data through the volume 552, as illustrated by FIG. 5E. The volume 552 corresponds to a traditional volume where clients directly read and write data through a file system of the volume 552 to blocks stored within the local storage 506.

One embodiment of caching data during an on-demand restore using a cloud block map is illustrated by an exemplary method 400 of FIG. 4B, which is further described in conjunction with system 500 of FIGS. 5A-5D. A device 504 may store data on behalf of a client 502 within local storage 506, as illustrated by FIG. 5A. The device 504 may receive the restore request to restore the volume 508 back to the state captured by the first snapshot 514. In response to receiving the restore request to restore backup data within the first snapshot 514 stored within the remote object store 510, the on-demand volume 522 is created within the local storage 506 of the device 504, as illustrated by FIG. 5B. The on-demand volume 522 is initially an empty volume into which the restore process 520 (the on-demand restore operation) will restore the backup data from the first snapshot 514 within the remote object store 510. As part of initializing the restore process 520, metadata 530 of the first snapshot 514 may be retrieved from the remote object store 510. The metadata 530 is stored within the local storage 506 of the device 504, as illustrated by FIG. 5C. The metadata 530 is retrieved before backup data of the first snapshot 514 is restored from the remote object store 510 to the on-demand volume 522 within the local storage 506 of the device 504.

During operation 452 of method 400 of FIG. 4B, the client 502 is provided with access 542 to the on-demand volume 522 during the restore process 520 restoring 540 the backup data from the first snapshot 514 within the remote object store 510 to the on-demand volume 522 for storage within the local storage 506, as illustrated by FIG. 5D. In some embodiments, the client 502 is provided with the access 542 to the on-demand volume 522 during the restore process 520 once the metadata 530 has been copied from the remote object store 510 to the local storage 506. In this way, the restore process 520 is implemented to restore 540 the backup data from the first snapshot 514 within the remote object store 510 to the on-demand volume 522 for storage within the local storage 506.

In some embodiments of providing the client 502 with the access 542 to the on-demand volume 522 during the restore process 520, a request is received by the device 504 from the client 502. The request may target a particular block of data that has either been restored from the first snapshot 514 within the remote object store 510 to the on-demand volume 522 by the restore process 520 or has yet to be restored from the first snapshot 514 within the remote object store 510 to the on-demand volume 522 by the restore process 520.

In response to receiving the request, the metadata 530 is evaluated to determine whether the block has been restored from the first snapshot 514 within the remote object store 510 to the on-demand volume 522 by the restore process 520 or has yet to be restored from the first snapshot 514 within the remote object store 510 to the on-demand volume 522 by the restore process 520. For example, the metadata 530 is traversed to identify a virtual volume block number entry mapped to a physical volume block number entry for the block. If the virtual volume block number entry comprises a virtual volume block number and/or the physical volume block number entry comprises a physical volume block number, then the block has been restored from the first snapshot 514 within the remote object store 510 to the on-demand volume 522 by the restore process 520. Accordingly, the block is retrieved from the local storage 506 through the on-demand volume 522 using the virtual volume block number and/or the physical volume block number. The block is then provided to the client 502 in response to the request. The block is retrieved and provided to the client 502 while the restore process 520 is restoring 540 the backup data of the first snapshot 514 within the remote object store 510 to the on-demand volume 522.

If the virtual volume block number entry comprises a cloud block number and/or the physical volume block number entry comprises an absent indicator, then the block has not yet been restored from the first snapshot 514 to the on-demand volume 522 by the restore process 520. Accordingly, a cloud block map 532 is evaluated to determine whether the block has been cached within the cloud block map 532. The cloud block map 532 may be stored within the local storage 506 of the device 504 so that the client 502 can be provided with low latency access to cached blocks within the local storage 506. This is because retrieving cached blocks of the cloud block map 532 from the local storage 506 is faster than retrieving backup data over a network from the remote object store 510. In this way, the cloud block map 532 can be used to provide the client 502 with low latency access to cached blocks of backup data of the first snapshot 514 not yet restored to the on-demand volume 522 by the restore process 520.

If the block being requested by the client 502 has not yet been restored to the on-demand volume 522 and has been cached as a cached block within the cloud block map 532, then the client 502 is provided with access to the cached block within the cloud block map 532. In an example, the metadata 530 comprises a cloud block number of the block being requested and an absent indicator because the block has not yet been restored to the on-demand volume 522. The cloud block number in the metadata 530 can be used to search the cloud block map 532 to determine whether the block has been cached within the cloud block map 532. That is, the cloud block map 532 maps cloud block numbers of cached blocks to physical volume block numbers of the cached blocks. The physical volume block numbers may correspond to storage locations of the cached blocks within the local storage 506. In this way, the cloud block number identified from the metadata 530 may be used to search the cloud block map 532 to determine whether the block has been cached within the cloud block map 532 as a cached block based upon the cloud block number being mapped to the physical volume block number of where the cached block is stored within the local storage 506 of the device 504. Accordingly, the client 502 is provided with access to the cached block located within the local storage 506 according to the physical volume block number in the cloud block map 532 if the block has been cached within the cloud block map 532 as the cached block.

If the block being requested by the client 502 has not yet been restored and is not cached within the cloud block map 532, then block is retrieved 548, over a network connection between the device 504 and the remote object store 510, from the first snapshot 514 within the remote object store 510 using the cloud block number, during operation 454 of method 400 of FIG. 4B. The block is retrieved while the restore process 520 is restoring 540 the backup data of the first snapshot 514 within the remote object store 510 to the on-demand volume 522 in the local storage 506. During operation 456 of method 400 of FIG. 4B, the block is cached within the cloud block map 532 stored within the local storage 506. For example, the cloud block number, identified from the metadata 530 and used to retrieve the block from the first snapshot within the remote object store 510, is inserted into the cloud block map 532. The cloud block number is mapped to a physical volume block number of where the cached block is stored within the local storage 506. During operation 458 of method 400 of FIG. 4B, the client 502 is provided with access to the cached block within the cloud block map 532. The client 502 may access the cached block within the cloud block map 532 while the restore process 520 is restoring 540 the backup data of the first snapshot 514 within the remote object store 510 to the on-demand volume 522 in the local storage 506.

The cached block may comprise backup data of a file captured by the first snapshot 514 in the remote object store 510. As part of the restore process 520, the file is to be restored to the on-demand volume 522 according to the state of the file captured by the first snapshot 514. Accordingly, any modifications to the cached block within the cloud block map 532 by the client 502 are not propagated to the file being restored to the on-demand volume 522. This preserves the integrity of the file being restored by the restore process 520.

When the restore process 520 restores the block of backup data from the first snapshot 514 within the remote object store 510 to the on-demand volume 522 within the local storage 506, the cloud block number within the virtual volume block number entry for the block is replaced with a virtual volume block number of the block within the on-demand volume 522. Also, when the restore process 520 restores the block of backup data from the first snapshot 514 within the remote object store 510 to the on-demand volume 522 within the local storage 506, the absent indicator within the physical volume block number entry for the block is replaced with a physical volume block number of the block within the local storage 506. When the restore process 520 restores the block of backup data, a determination is made as to whether the block was cached within the cloud block map 532. If the block was cached within the cloud block map 532 as the cached block, then the cached block is evicted/removed from the cloud block map 532.

Temperature tracking 544 and an eviction scanner 546 is implemented so that the storage space consumed by the cloud block map 532 is not wasted in storing cached blocks that are no longer being access by the client 502. Accordingly, temperature metrics of cached blocks within the cloud block map 532 are tracked. A temperature metric for a cached block is derived from a last time that the cached block was accessed. In an example, an evaluation may be periodically performed to determine whether the cached block has been accessed since a last evaluation. If the cached block has not been accessed since the last evaluation, then the temperature metric for the cached block is decreased to indicate that the cached block is becoming more infrequently accessed ("colder"). If the cached block has been accessed since the last evaluation, then the temperature metric for the cached block is increased to indicate that the cached block is becoming more frequently accessed ("hotter").

The eviction scanner 546 is executed to evaluate the temperature metrics of the cached blocks to determine whether to evict (remove) or retain the cached blocks in the cloud block map 532. In response to the eviction scanner 546 determining that the temperature metric of the cached block is below a threshold indicating that the cached block is infrequently accessed ("cold"), the cached block is evicted from the cloud block map 532 in order to conserve storage spaced consumed by the cloud block map 532. In response to the eviction scanner 546 determining that the temperature metric of the cached block exceeds the threshold indicating that the cached block is frequently accessed ("hot"), the cached block is retained within the cloud block map 532 for low latency access by the client 502.

During the restore process 520, as backup data is restored from the first snapshot 514 to the on-demand volume 522, the restore process 520 tracks progress/completion of the restoration (e.g., an amount of data restored at a particular amount of time out of a total amount of data to restore) so that the restore process 520 can determine when all backup data has been restored and the restore process 520 is complete. In response to the restore process 520 completing (e.g., all backup data of the first snapshot 514 has been restored from the remote object store 510 to the on-demand volume 522), the on-demand volume 522 is converted to a volume exposed to the client 502 and/or other clients for read and write access of data through the volume. The volume may correspond to a traditional volume where clients directly read and write data through a file system of the volume to blocks stored within the local storage 506.

Figure 6:
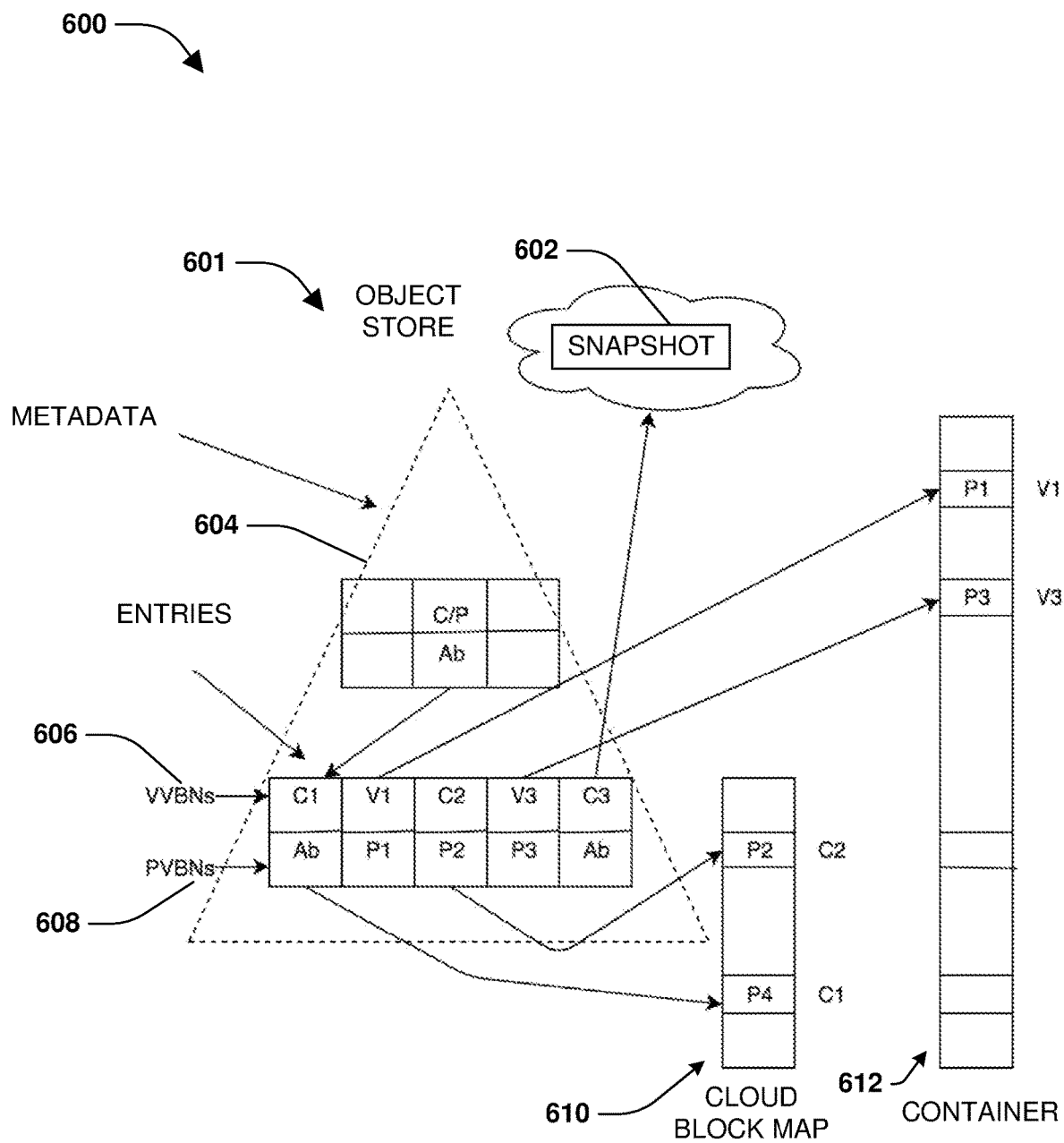
FIG. 6 is a block diagram illustrating an example system for on-demand restore of a snapshot to an on-demand volume accessible to clients.

FIG. 6 illustrates an example system 600 for on-demand restore of a snapshot to an on-demand volume accessible to clients. A remote object store 601 stores a snapshot 602 of a volume that has been backed up from local storage to the remote object store 601. Metadata 604 of the snapshot 602 corresponds to a buftree hierarchy comprising one or more levels of indirect blocks and a bottom level of direct blocks. The indirect blocks comprise pointers to blocks within a level below the indirect blocks. The direct blocks may correspond to user data. The metadata 604 may comprise entries corresponding to buftree indirect blocks. The entries may comprise virtual volume block number entries 606 mapped to physical volume block number entries 608. Each block of backup data may be associated with a virtual volume block number entry and a physical volume block number entry.

If a virtual volume block number entry comprises a virtual volume block number (e.g., virtual volume block number V1) and/or a physical volume block number entry comprises a physical volume block number (e.g., physical volume block number P1), then the block has been restored from the snapshot 602 to an on-demand volume by a restore process (e.g., an on-demand restore operation). Accordingly, the virtual volume block number and/or the physical volume block number entry are used to provide a client with access the block, such as through a container file 612, during the restore process.

If a virtual volume block number entry comprises a cloud block number (e.g., cloud block number C1) and/or a physical volume block number entry comprises an absent indicator (e.g., Ab), then the block has not yet been restored from the snapshot 602 to the on-demand volume by the restore process. If the block has not yet been restored and is not cached within a cloud block map 610, then the cloud block number may be used to retrieve the block from the snapshot 602 (e.g., cloud block number C1 may be used to locate and retrieve the block from the remote object store 601). The block may be stored within the cloud block map 610 (e.g., cloud block number C1 may be mapped to physical volume block number P4 of where the block is stored within local storage), and a client may be provided with access to the block through the cloud block map 610 during the restore process.

In some embodiments, the metadata 604 comprises the cloud block number C1 mapped to the absent allocator (Ab) to indicate that a block referenced by the cloud block number C1 has not yet been restored from the snapshot 602. The metadata 604 comprises the virtual volume block number V1 mapped to the physical volume block number P1 to indicate that a block referenced by virtual volume block number V1 has been restored and is stored within the container file 612 at a storage location corresponding to the physical volume block number P1. The metadata 604 comprises a cloud block number C2 mapped to a physical volume block number P2 to indicate that a block referenced by the cloud block number C2 has been cached within the cloud block map 610 at a storage location corresponding to the physical volume block number P2. The metadata 604 comprises a virtual volume block number V3 mapped to a physical volume block number P3 to indicate that a block referenced by virtual volume block number V3 has been restored is stored within the container file 612 at a storage location corresponding to the physical volume block number P3. The metadata 604 comprises the cloud block number C3 mapped to the absent allocator (Ab) to indicate that a block referenced by the cloud block number C3 has not yet been restored.

Figure 7:
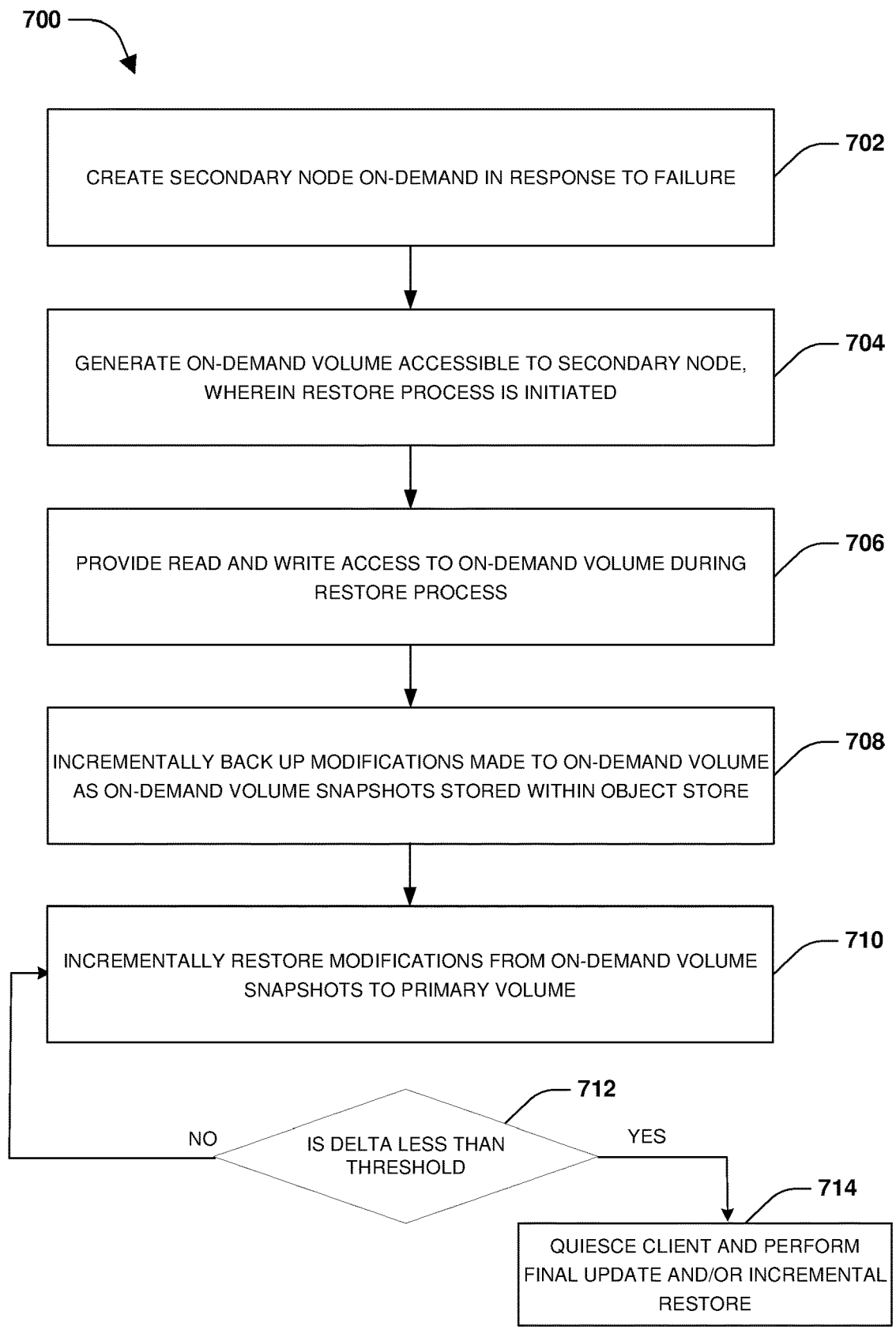
FIG. 7 is a flow chart illustrating an example method for on-demand serverless disaster recovery.
Figure 8A:
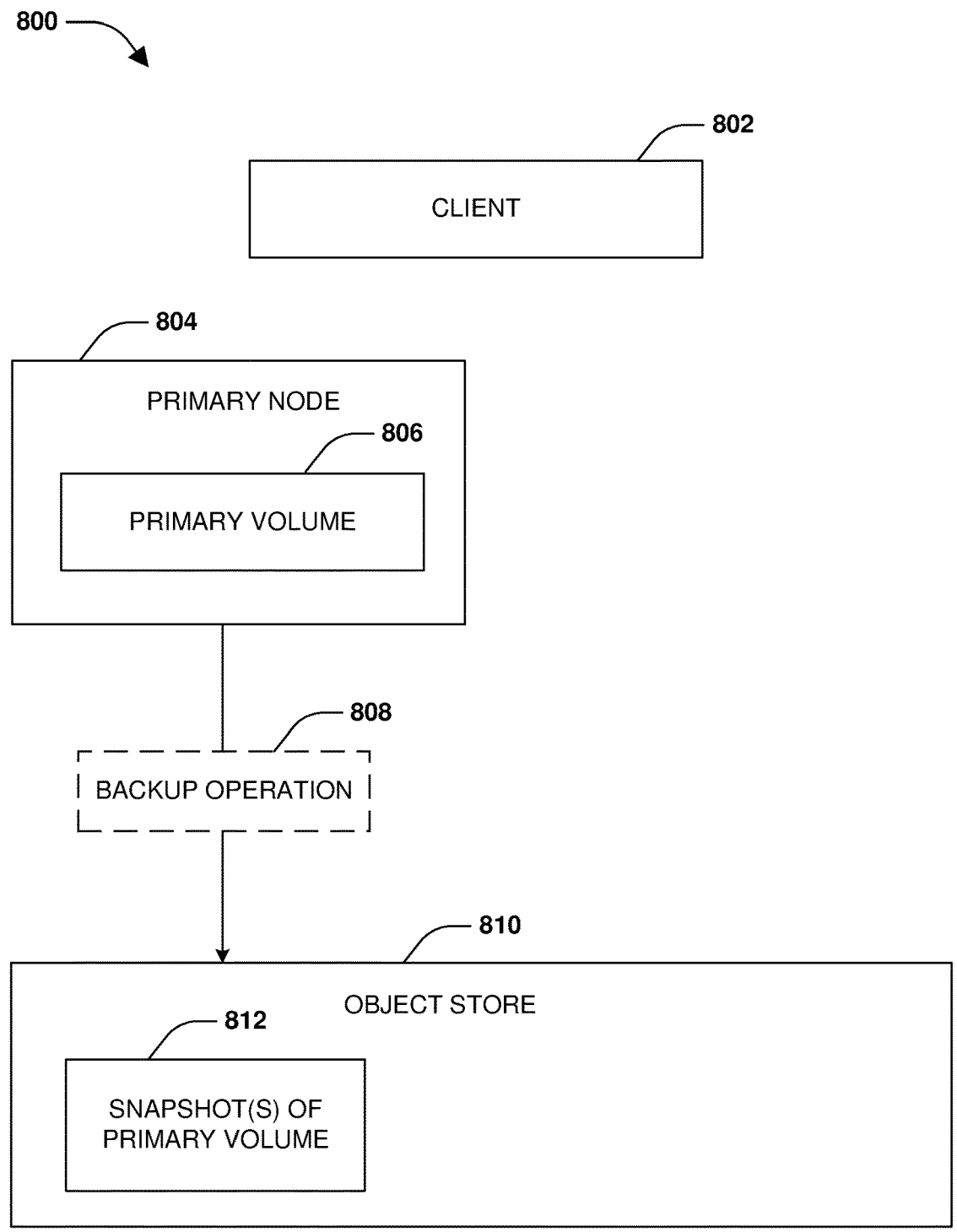
FIG. 8A is a block diagram illustrating an example system for on-demand serverless disaster recovery.

One embodiment of on-demand serverless disaster recovery is illustrated by an exemplary method 700 of FIG. 7, which is further described in conjunction with system 800 of FIGS. 8A-8F. A primary node 804 is configured to provide clients, such as client 802, with access to a primary volume 806, as illustrated by FIG. 8A. The primary node 804 may be hosted as a storage controller, a server, a virtual machine, a storage virtual machine, a container (e.g., a container hosted within a container orchestration platform on a worker node such as a kubernetes cluster), hardware, software (e.g., a container hosting a file system service), logical constructs, compute and storage of a cloud computing environment or multitenant environment, or combinations thereof. The primary node 804 may be configured to perform backup operations 808 to generate snapshots 812 of the primary volume 806. Snapshot data (backup data) of the snapshots 812 may be stored within objects in an object store 810 according to an object format. These objects are formatted according to the object format that is tailored for the object store 810 so that the snapshot data (backup data) of particular snapshots may be identified and retrieved from objects storing such data.

Figure 8B:
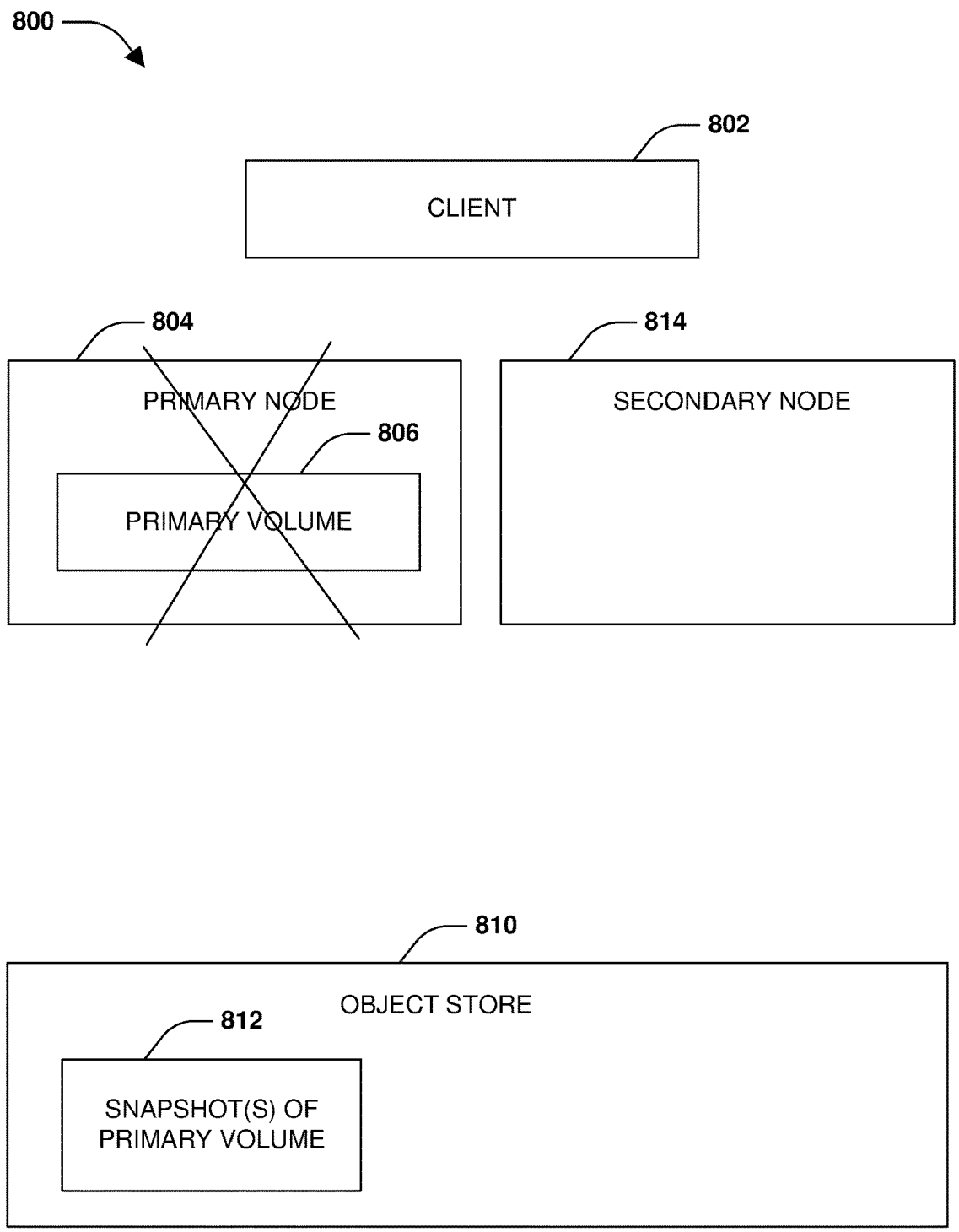
FIG. 8B is a block diagram illustrating an example system for on-demand serverless disaster recovery, where a primary node and/or primary volume experience a failure.

In some embodiments, the primary node 804 may be configured according to a serverless disaster recovery relationship where there may not be a secondary node being maintained during normal operation of the primary node 804. This conserves computing and storage resources otherwise wasted in maintaining a secondary node during normal operation of the primary node 804 providing the client 802 with access to the primary volume 806. The primary node 804 and/or the primary volume 806 may experience a failure, as illustrated by FIG. 8B. The failure is a trigger to create a secondary node 814. For example, the trigger causes a script to execute that constructs the secondary node 814, such as by creating ("spinning up") a container, a virtual machine, or other type of node (e.g., a worker node of a kubernetes cluster) capable of providing clients with failover access to data previously accessible through the primary node 804 before the failure. For example, the script dynamically assigns compute and storage resources to a container created, by the script, within a kubernetes cluster that will function as the secondary node. Accordingly, during operation 702 of method 700, the secondary node 814 is created on-demand in response to the failure associated with the primary node 804 and/or the primary volume 806.

Figure 8C:
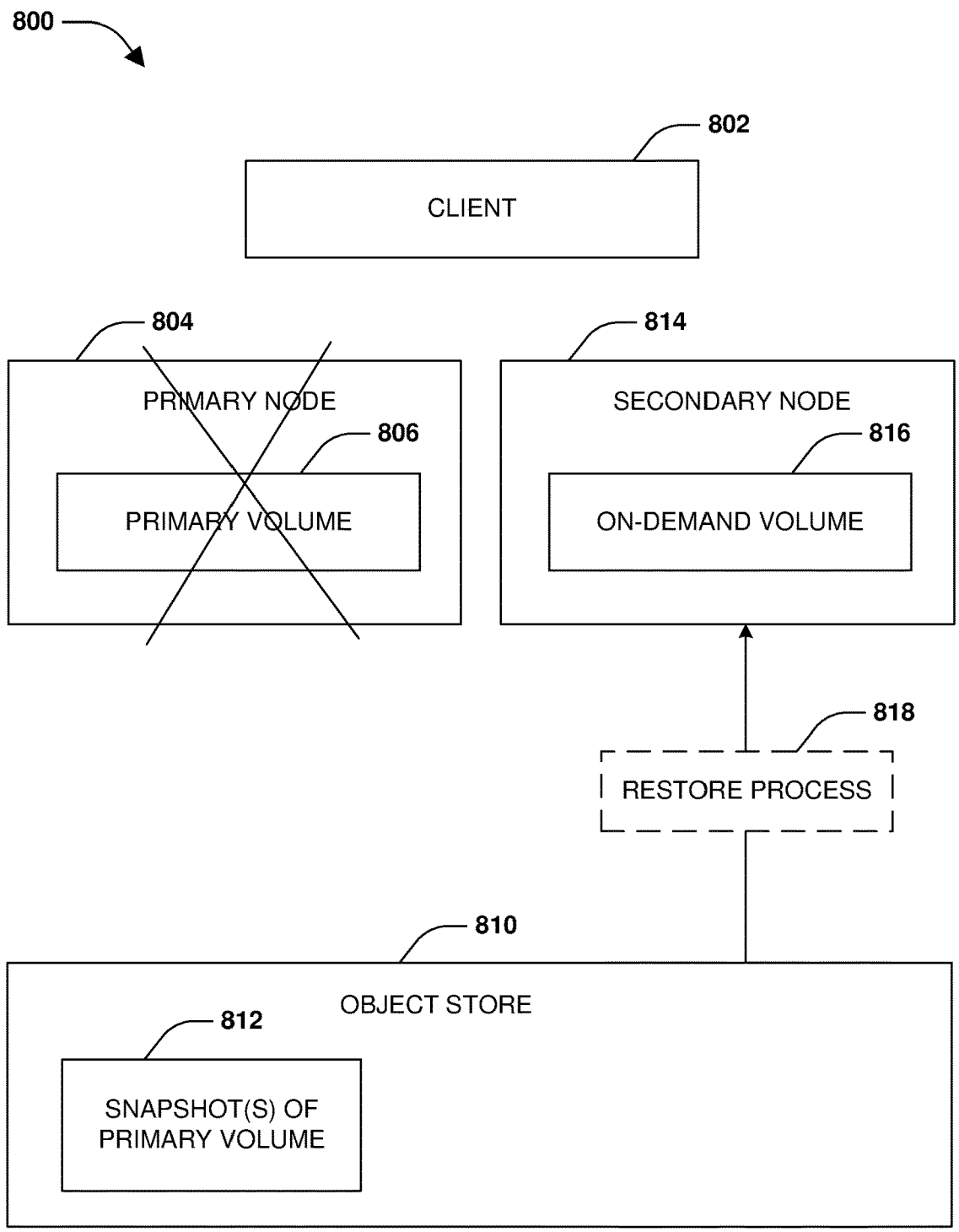
FIG. 8C is a block diagram illustrating an example system for on-demand serverless disaster recovery, where a restore process is performed.

During operation 704 of method 700, an on-demand volume 816 is generated in response to the failure associated with the primary node 804 and/or the primary volume 806, as illustrated by FIG. 8C. The on-demand volume 816 is generated and made accessible to the secondary node 814. A restore process 818 is initiated to restore the on-demand volume 816 to a state of the primary volume 806 captured within one or more of the snapshots 812 of the primary volume 806, whose snapshot data (backup data) is stored within objects in the object store 810. Initially, the restore process 818 may copy metadata from a snapshots of the primary volume 806 to the secondary node 814. In some embodiments, the metadata may comprise a superblock, an inofile, directory file, or other root metadata of a file system. The secondary node 814 may utilize the metadata to rebuild a rel state metafile that is used to track a rel root (e.g., base root object 1012 used as an entry point to reference a volume that has been backed up as snapshots to an object store) and/or snapinfo objects (e.g., snapinfo object 1016 used to reference a particular snapshot of the volume) in the object store 810. The rel state metafile may reflect a latest state of object store endpoint top level objects (e.g., objects located at a highest level of a tree structure representing snapshot data/objects within the object store 810). Once the metadata has been copied to the secondary node 814, the restore process 818 restores snapshot data (e.g., snapshot/backup data in blocks stored within objects in the object store 810, which may be located and retrieved using cloud block numbers assigned to the blocks) from the snapshots 812 to the on-demand volume. During the restore process 818, the secondary node 814 provides the client 802 with access to the on-demand volume 816 once the metadata has been copied to the secondary node 814, such as at a point in time before all of the snapshot data has been copied to the on-demand volume 816 by the restore process 818. In this way, read and write access is provided to the on-demand volume 816 during the restore process 818, during operation 706 of method 700.

In some embodiments of providing the client 802 with access to the primary volume 806 during the restore process 818, a request such as a read or write request may be received from the client 802 for a block of data. If the block of data has been restored from the snapshots 812 to the on-demand volume 816, then the block of data is used to process the request from the client 802. If the block of data has not yet been restored from the snapshots 812 to the on-demand volume 816, then the block of data is retrieved on-demand from a snapshot (e.g., from an object storing the block of data of the snapshot) in the object store 810. The block of data may be cached using a cloud block map so that the cloud block map may map a cloud block number of the block in the object store 810 to a physical volume block number of the cached block at the secondary node 814. In this way, the request is processed using the cached block and the client 802 may be provided with subsequent access to the cached block through the cloud block map in an efficient manner since the cached block may be quickly accessed through the cloud block map as opposed to being retrieved over a network from the object store 810.

It may be appreciated that the creation of the on-demand volume 816, the restore process 818, how clients are provided with access to the on-demand volume 816 during the restore process 818, and/or the use a cloud block map may be similar or the same as such techniques described in relation to method 400 of FIG. 4A, method 450 of FIG. 4B, system 500 of FIGS. 5A-5E, and/or system 600 of FIG. 6.

Figure 8D:
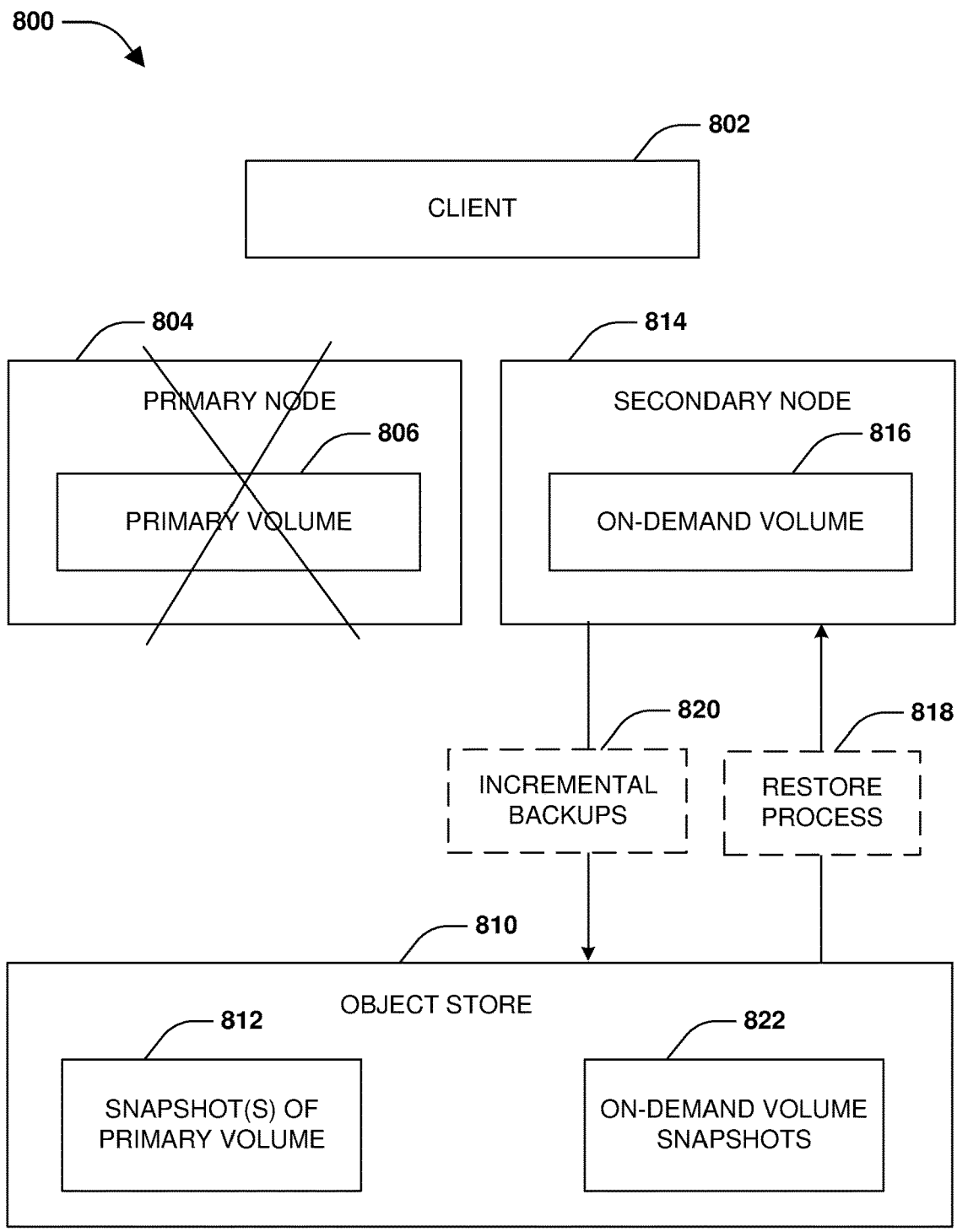
FIG. 8D is a block diagram illustrating an example system for on-demand serverless disaster recovery, where incremental backups are performed.
Figure 8E:
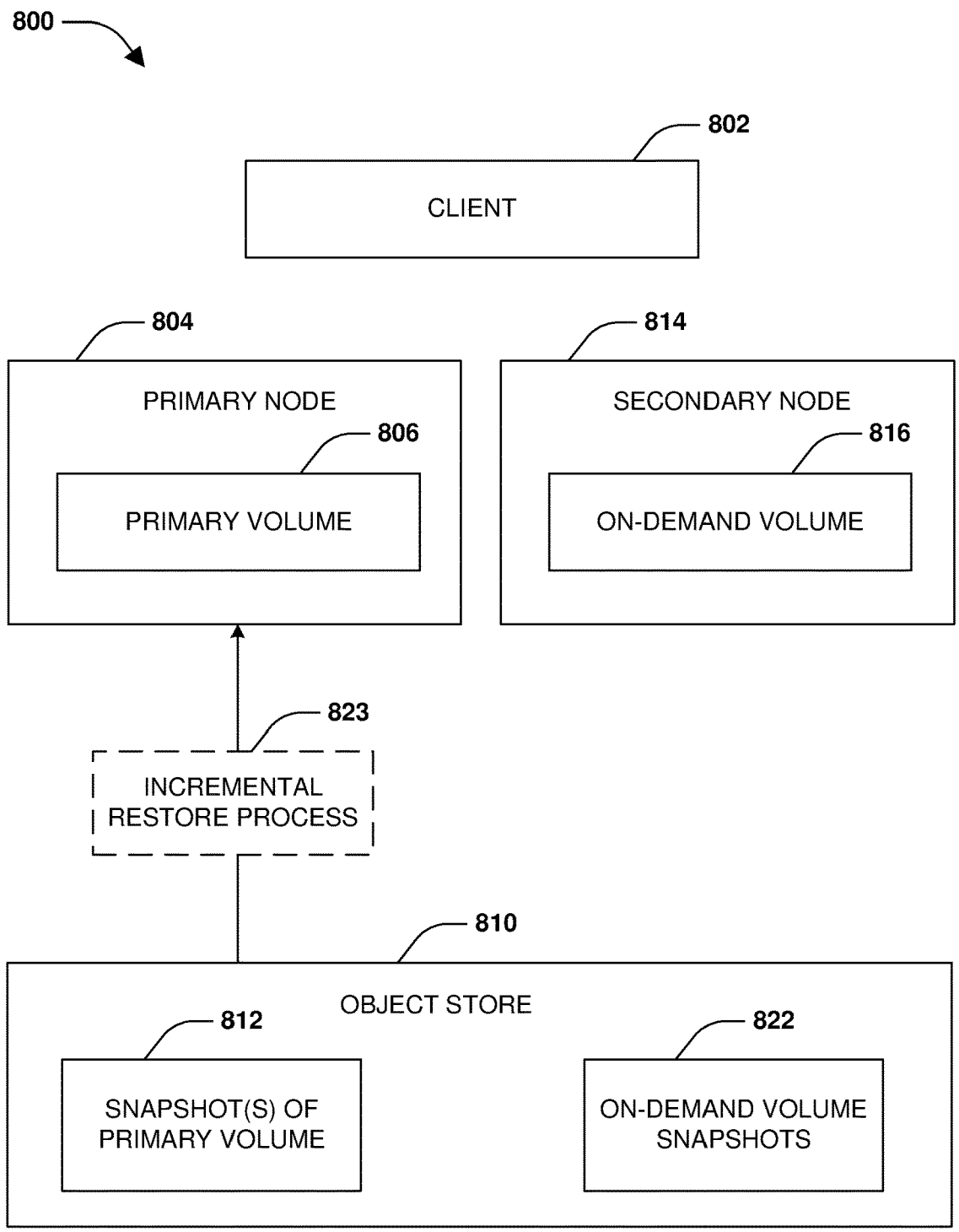
FIG. 8E is a block diagram illustrating an example system for on-demand serverless disaster recovery, where an incremental restore process is performed.

During operation 708 of method 700, incremental backups 820 of modifications to the on-demand volume 816 (e.g., modifications to restored data and/or cached blocks in the cloud block map) may be performed to the object store 810 to create on-demand volume snapshots 822, as illustrated by FIG. 8D. The on-demand volume snapshots 822 are incremental, and thus each on-demand volume snapshot may capture modifications to the on-demand volume 816 since a last on-demand volume snapshot. In some embodiments, the on-demand volume snapshots 822 excludes unmodified restored data that has been restored from the snapshots 812 by the restore process 818 to the on-demand volume 816 but has not been modified. This conserves storage and network bandwidth resources because merely the modifications to the on-demand volume 816 (e.g., to the cached blocks in the cloud block map) are incrementally backed up as the on-demand volume snapshots 822. In some embodiments, when an incremental backup is to be performed, the cloud block map is evaluated to identify unmodified restored data within the on-demand volume 816 and modified data (e.g., modified cached blocks in the cloud block map) that has been modified by the client 802 while the secondary node 814 is providing failover access to the on-demand volume 816. The modified data corresponds to modifications that may be incrementally backed up to the object store 810 as an on-demand volume snapshot by the incremental backup.

The primary node 804 and/or the primary volume 806 recovers from the failure. However, the primary volume 806 may lag behind the on-demand volume 816 due to the modifications made by the client 802 through the secondary node 814 to the on-demand volume 816. These modifications were incrementally backed up as the on-demand volume snapshots 822 in the object store 810. Accordingly, during operation 710 of method 700, an incremental restore process 823 is performed to incrementally restore the modifications from the on-demand volume snapshots 822 to the primary volume 806. Because the client 802 may still access the on-demand volume 816, the incremental restore process 823 tracks a delta between the primary volume 806 and the on-demand volume 816 (e.g., based upon how much data is being restored by each incremental restore of an on-demand volume snapshot to the primary volume 806) to determine if the delta is less than a threshold, during operation 712 of method 700. In response to the delta between the primary volume 806 and the on-demand volume 816 being less than a threshold, the client 802 may be quiesced from accessing the on-demand volume 816 so that the on-demand volume 816 is no longer being modified with new modifications that would need to be restored to the primary volume 806, during operation 714 of method 700. Accordingly, a final update and/or a final incremental restore to the primary volume 806 is performed so that the primary volume 806 mirrors the on-demand volume 816. In this way, the client 802 is failed over from accessing the on-demand volume 816 through the secondary node 814 to accessing the primary volume 806 through the primary node 804. Otherwise, if the delta is not less than the threshold, then the incremental restore process 823 continues to perform incremental restores.

In some embodiments, a metafile (e.g., a mapping metafile such as a VMAP) is rebuilt before the client is failed over to the primary node 804 for accessing the primary volume 806. For example, a first snapshot difference operation may be performed upon a snapshot of the primary volume 806 in order to identify a first set of information. The first set of information comprises inode numbers, levels within a snapshot tree structure (e.g., levels within a tree structure of the primary volume 806 as captured by the snapshot), file block numbers, and/or virtual volume block numbers. In this way, the first set of information may comprise information describing the data (e.g., inode numbers of files, file block numbers of the files, and/or virtual volume block numbers of blocks) and the structure of the data (e.g., the levels within the tree structure of the primary volume 816 as captured by the snapshot) of the primary volume 806 as captured by the snapshot.

A second snapshot difference operation is performed upon a corresponding cloud snapshot (e.g., a snapshot backed up to the object store 810, such as one of the snapshots 812) in order to identify a second set of information. The second set of information comprises inode numbers, levels within a cloud snapshot tree structure (e.g., levels within a tree structure of the primary volume 806 as captured by the corresponding cloud snapshot), file block numbers, and/or virtual volume block numbers. In this way, the second set of information comprises information describing the data (e.g., inode numbers of files, file block numbers of the files, and/or virtual volume block numbers of blocks) and the structure of the data (e.g., the levels within the tree structure of the primary volume 806 as captured by the correspond cloud snapshot) of the primary volume 806 as captured by the cloud snapshot. In this way, the metafile is rebuilt to record virtual volume block number (e.g., logical addresses of blocks of the primary volume 806 at the primary node 804) to cloud block number (e.g., locations of blocks within objects in the object store 810) mappings for common inode numbers, levels, and/or file block numbers that are common amongst the first set of information and the second set of information. In particular, information that is common to both the first set of information and the second set of information is populated into the metafile to rebuild the metafile.

Figure 8F:
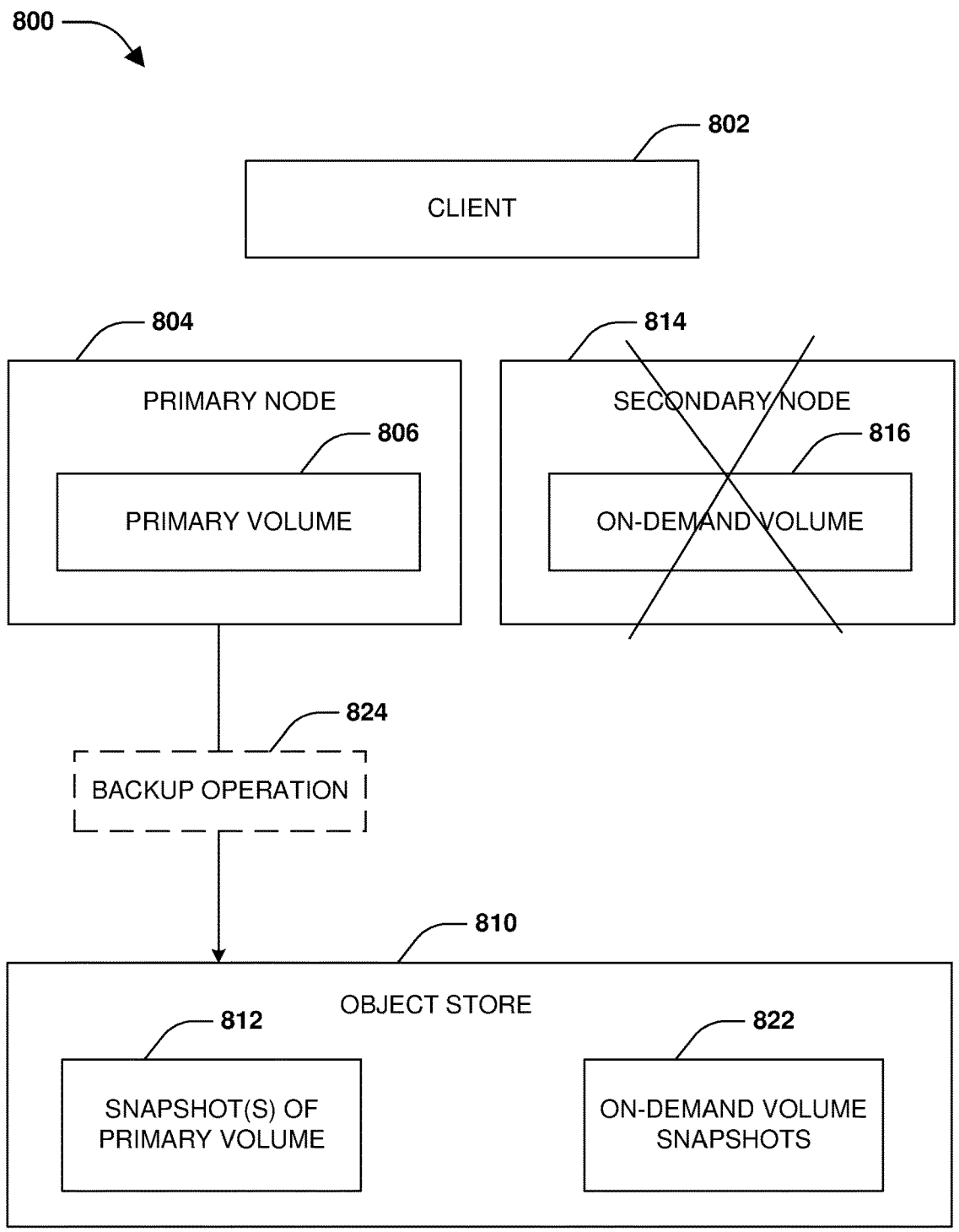
FIG. 8F is a block diagram illustrating an example system for on-demand serverless disaster recovery, where a secondary node and on-demand volume are destroyed.

Once the incremental restore process 822 has completed and/or the metafile and/or the rel state metafile are rebuilt, then the client 802 is failed over to the primary node 804 for accessing the primary volume 806, as illustrated by FIG. 8F. In order to conserve compute and storage resources, the secondary node 814 and/or the on-demand volume 816 may be destroyed once the client 802 has been successfully failed over to accessing the primary volume 806 through the primary node 804. A mirroring relationship is established from the primary volume 806 to the object store 810 in order to perform backup operations 824 that store snapshots of the primary volume 806 to the object store 810 within objects according to the object format.

Figure 9:
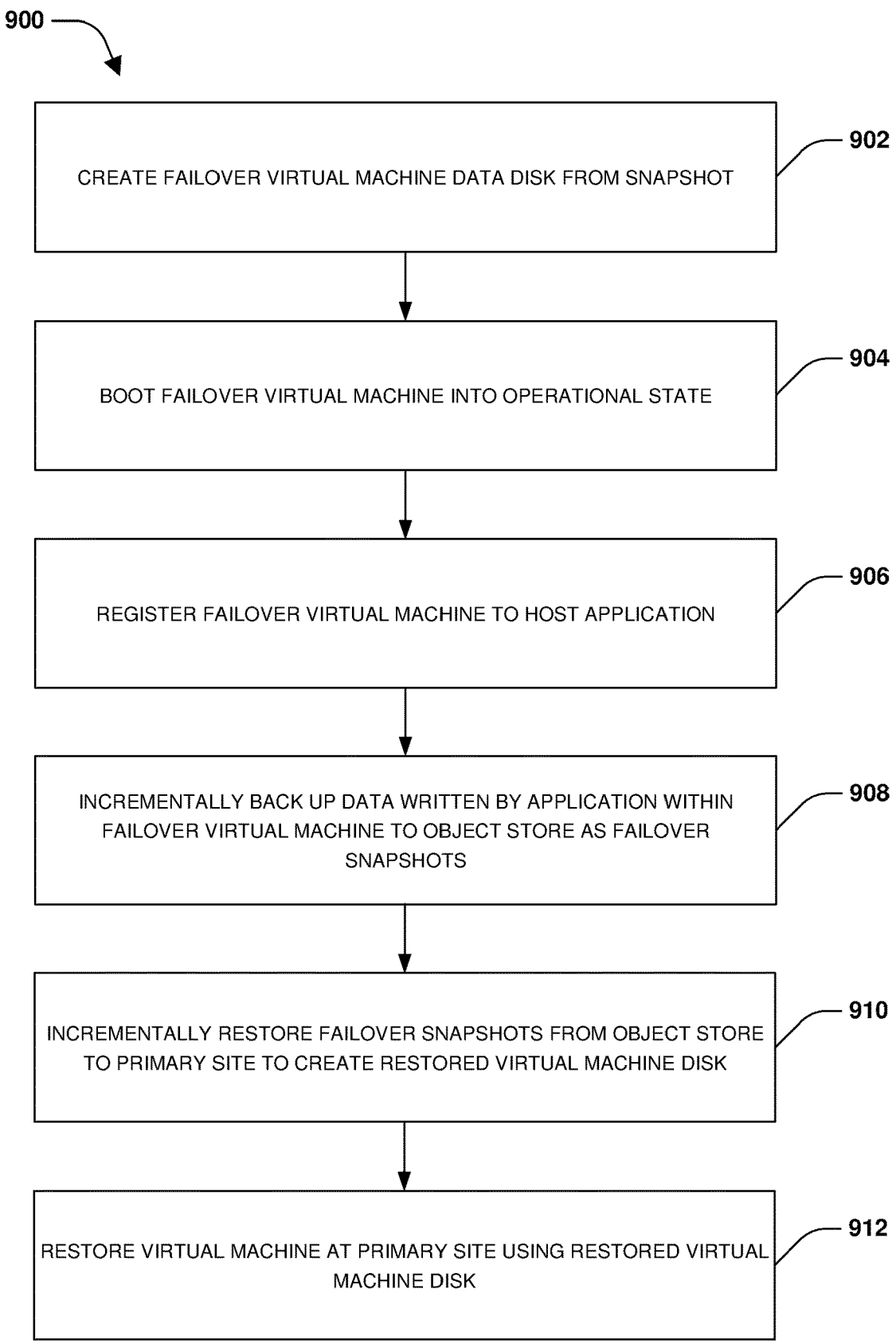
FIG. 9 is a flow chart illustrating an example method for on-demand serverless disaster recovery for virtual machines.

One embodiment of on-demand serverless disaster recovery for virtual machines is illustrated by an exemplary method 900 of FIG. 9. A primary site (e.g., primary node 804 of FIGS. 8A-8F) may host a virtual machine. Snapshots of virtual machine data disks of the virtual machine may be created and stored to an object store (e.g., object store 810 of FIGS. 8A-8F) within objects according to an object format. If there is a detected failure associated with the virtual machine, one or more of the snapshots backed up to the object store are used to create a failover virtual machine data disk, during operation 902 of method 900. In particular, data of a virtual machine data disk of the virtual machine was backed up as backup data within a snapshot stored within the object store. The backup data can be restored from the snapshot in the object store to create the failover virtual machine data disk. In some embodiments, the failover virtual machine data disk is hosted at a site different than the primary site that has failed, such as by being hosted on a different node of a cluster such as a worker node of a kubernetes cluster. On-demand read and write access is provided once indirect blocks (e.g., metadata) of the virtual machine data disk have been retrieved from the snapshots and stored into the failover virtual machine data disk. The remaining data is transferred from the snapshots in the object store into the failover virtual machine data disk, such as by using the restore process 818 of FIG. 8C.

During operation 904 of method 900, a failover virtual machine is booted into an operational state using the failover virtual machine data disk. During operation 906 of method 900, the failover virtual machine is registered to host an application that was previously hosted by the virtual machine before the failure. During operation 908 of method 900, data written by the application executing in the failover virtual machine (e.g., data written to the failover virtual machine disk) is incrementally backed up to the object store as failover snapshots. Subsequently, the primary site recovers from the failure. Accordingly, during operation 910 of method 900, failover snapshots are incrementally restored from the object store to the primary site to create a restored virtual machine data disk at the primary site. During operation 912 of method 900, the virtual machine is restored at the primary site using the restored virtual machine data disk. Once the virtual machine is restored, the failover virtual machine is quiesced (e.g., applications executing within the virtual machine are quiesced from writing new data to the failover virtual machine data disk) and destroyed.

In some embodiments of restoring the virtual machine, a metafile (e.g., a mapping metafile such as a VMAP) is rebuilt as part of restoring the virtual machine. For example, a snapshot at the primary site may be evaluated in order to identify a first set of information. The first set of information may comprise inode numbers, levels within a snapshot tree structure (e.g., levels within a tree structure of a virtual machine data disk as captured by the snapshot), file block numbers, and/or virtual volume block numbers. In this way, the first set of information comprises information describing the data (e.g., inode numbers of files, file block numbers of the files, and/or virtual volume block numbers of blocks) and the structure of the data (e.g., the levels within the tree structure of the virtual machine data disk as captured by the snapshot) of the virtual machine data disk as captured by the snapshot.

A corresponding cloud snapshot (e.g., a snapshot of the virtual machine data disk backed up to the object store 810) is evaluated in order to identify a second set of information. The second set of information may comprise inode numbers, levels within a cloud snapshot tree structure (e.g., levels within a tree structure of a virtual machine data disk as captured by the cloud snapshot), file block numbers, and/or virtual volume block numbers. In this way, the second set of information may comprise information describing the data (e.g., inode numbers of files, file block numbers of the files, and/or virtual volume block numbers of blocks) and the structure of the data (e.g., the levels within the tree structure of the virtual machine disk as captured by the cloud snapshot) of the virtual machine data disk as captured by the cloud snapshot. In this way, the metafile is rebuilt to record virtual volume block number (e.g., logical addresses of blocks of the virtual machine data disk) to cloud block number (e.g., locations of blocks within objects in the object store) mappings for common inode numbers, levels, and/or file block numbers that are common amongst the first set of information and the second set of information.

In some embodiments, a rel state metafile is rebuilt to track a rel root and/or snapinfo objects in the object store. The rel state metafile reflects a latest state of object store endpoint top level objects (e.g., objects located at a highest level of a tree structure representing snapshot data/objects within the object store). Once the metafile (e.g., a VMAP metafile) and/or the rel state metafile are reconstructed, backups from the virtual machine (e.g., incremental backups of modifications to the restored virtual machine data disk) to the object store may resume.

Figure 10A:
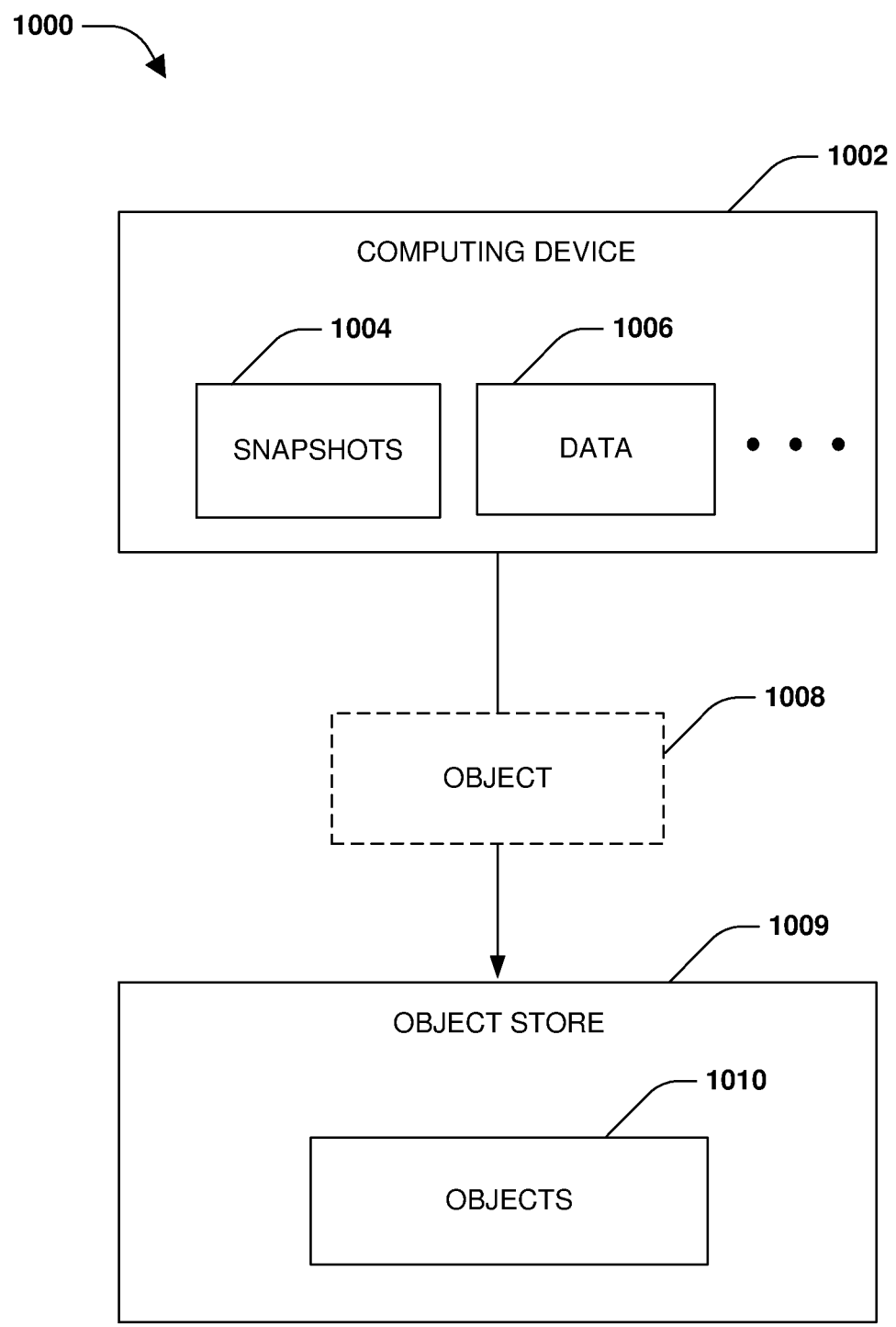
FIG. 10A is a component block diagram illustrating an example system for managing objects within an object store using an object file system.

FIG. 10A illustrates a system 1000 for managing objects within an object store (a remote object store) using an object file system. The objects may store backup data of snapshots that can be restored on-demand to an on-demand volume using a restore process (e.g., an on-demand restore operation) such that clients are provided with access to the backup data during and before completion of the restore process. A computing device 1002 may comprise a node, a storage controller, a storage service, an on-premises computing device, a storage virtual machine, or any other hardware or software. The computing device 1002 may store data 1006 within storage devices (primary storage) managed by the computing device 1002. The computing device 1002 may provide client devices with access to the data 1006, such as by processing read and write operations from the client devices. The computing device 1002 may create snapshots 1004 of the data 1006, such as a snapshot of a file system of a volume accessible to the client devices through the computing device 1002. The computing device 1002 may be configured to communicate with an object store 1009 over a network. The object store 1009 may comprise a cloud computing environment remote to the computing device 1002.

As provided herein, an object file system and object format is provided for storing and accessing data, such as snapshots, stored within objects in the object store 1009. The data 1006, maintained by the computing device, is stored into a plurality of slots of an object 1008. Each slot represents a base unit of data of the object file system defined for the object store 1009. For example, the object 1008 comprises or any other number of slots (e.g., 1024 slots), wherein each slot comprises 10 kb of data or any other amount of data. It may be appreciated that objects may comprise any number of slots of any size. User data, directory blocks, metadata, and/or inofile blocks of an inofile comprising per inode metadata is stored into the slots of the object 1008. In an example, snapshot data, of a snapshot created by the computing device 1002 of a file system maintained by the computing device 1002, is stored into the object 1008. For example, the object 1008 may be maintained as an independent logical representation of the snapshot, such that data of the snapshot is accessible through the object 1008 without having to reference other logical copies of other snapshots stored within objects 1010 of the object store 1009. In an example, the data is converted from physical data into a version independent format for storage within the object 1008.

In an example, the object 1008 is created to comprise data in a compressed state corresponding to compression of the data within the primary storage of the computing device 1002. In this way, compression used by the computing device 1002 to store the data is retained within the object 1008 for storage within the object store 1009. The object 1008 may be assigned a unique sequence number. Each object within the object store 1009 is assigned unique sequence numbers.

An object header may be created for the object 1008. The object header comprises a slot context for slots within the object 1008. The slot context may comprise information relating to a type of compression used for compressing data within the object 1008 (if any compression is used), a start offset of a slot, a logical data length, a compressed data length, etc. The slot context may be used to access compressed data stored within the object 1008.

Figure 10B:
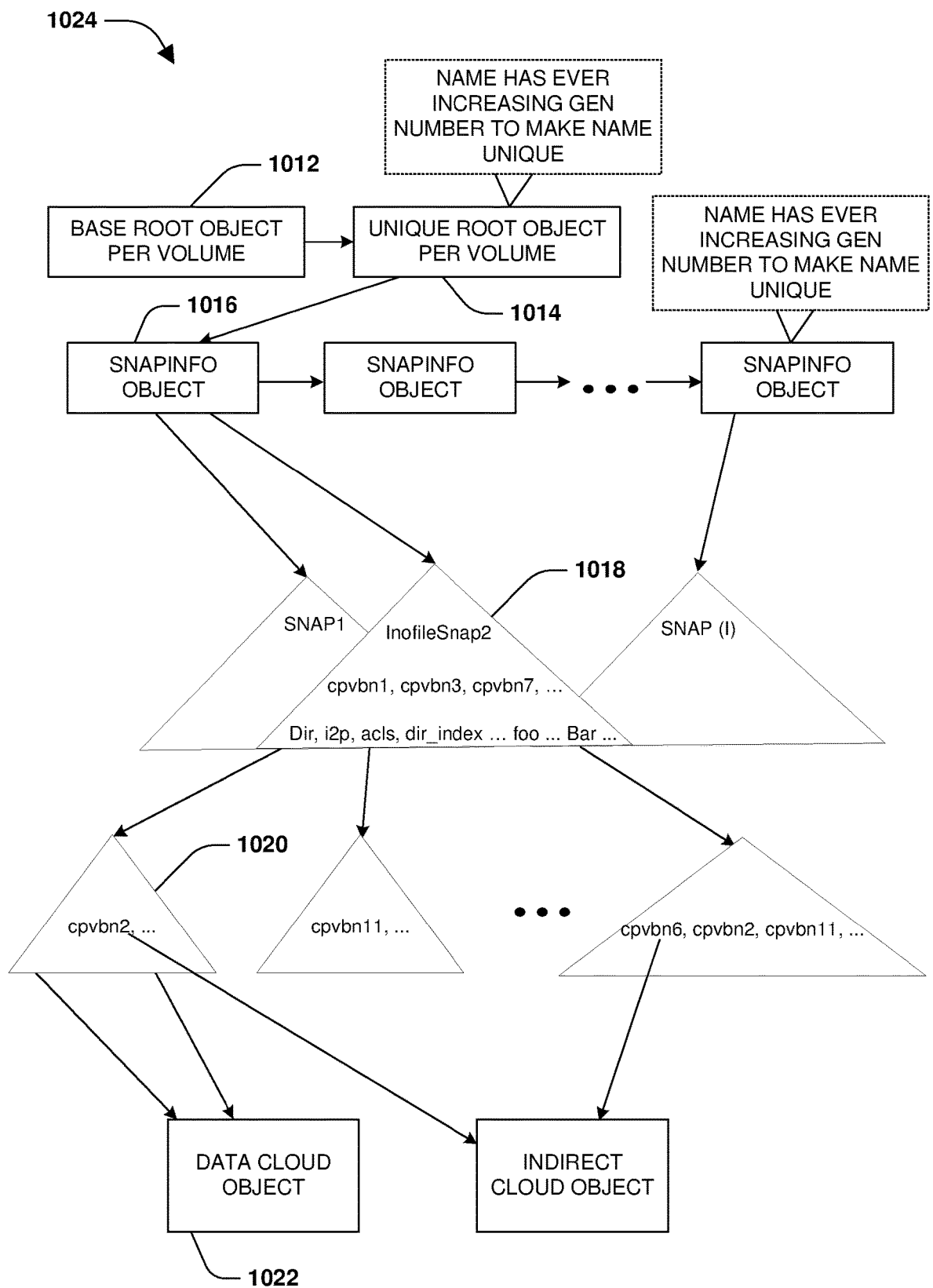
FIG. 10B is an example of a snapshot file system within an object store.
Figure 10C:
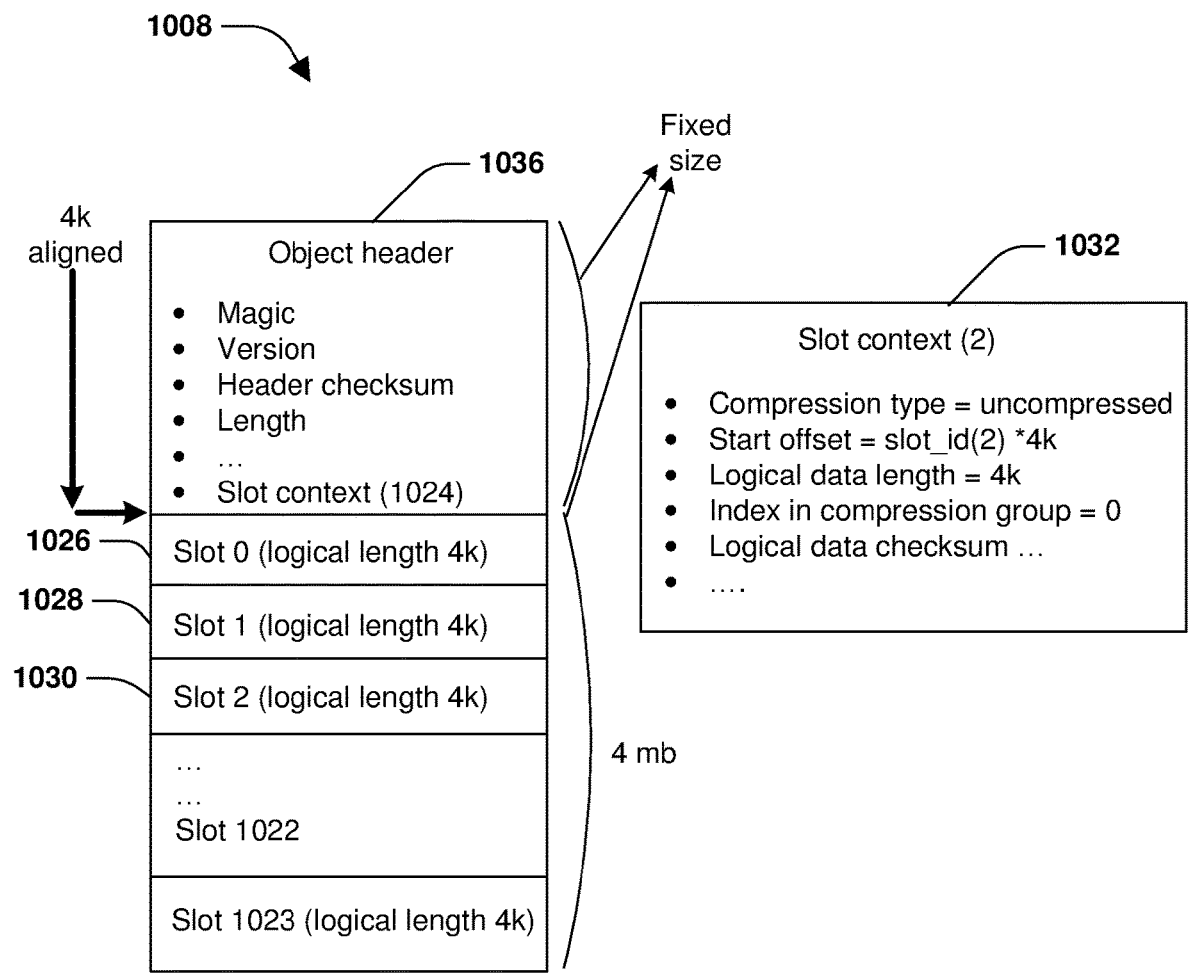
FIG. 10C is an example of an object stored within an object store.

FIG. 10C illustrates an example of the object 1008. The object 1008 comprises an object header 1036 and a plurality of slots, such as a slot 1026, a slot 1028, a slot 1030, and/or any other number of slots. The object header 1036 may have a size that is aligned with a start of the plurality of slots, such as having a 10 kb alignment based upon each slot having a logical length of 10 kb. It may be appreciated that slots may have any length. The object header 1036 comprises various information, such as a version identifier, a header checksum, a length of the object 1008, a slot context 1032, and/or other information used to access and manage data populated into the slots of the object 1008.

The slot context 1032 comprises various information about the slots, such as a compression type of a slot (e.g., a type of compression used to compress data of slots into a compression group or an indicator that the slot does not comprise compressed data), a start offset of the slot within the object 1008 (e.g., a slot identifier multiplied by a slot size, such as 10 kb), a logical data length of the slot (e.g., 10 kb), a compressed length (e.g., 0 if uncompressed), an index of the slot within a compression group of multiple slots (e.g., 0 if uncompressed), a logical data checksum, etc.

The data stored within the slots of the object 1008 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 1008 and/or a slot number of a slot comprising a portion of the data represented by the node. User data, directory blocks, metadata, inofile blocks of an inofile, and/or other data stored within the slots of the object 1008 may be represented by nodes within the data structure. In an example, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In an example of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 10B illustrates an object file system 1024 of data structures 10 (e.g., a tree structure that can be traversed by a data connector component) used to represent snapshots (e.g., snapshots of one or more volumes managed by the computing device 1002) stored into the objects 1010 of the object store 1009. There is one base root object per volume, such as a base root object 1012 for a volume of which the snapshots were captured. There is a unique root object per volume, such as a unique root object 1014 for the volume.

The base root object 1012 may point to the unique root object 1014. Names of the unique root objects may be derived from increasing generation numbers. The unique root object 1014 may point to snapinfo objects, such as a snapinfo object 1016 comprising information regarding one or more snapshots, such as a pointer to an inofile 1018 of a second snapshot of the volume. The inofile 1018 comprises cloud block numbers of slots within an object comprising data of the second snapshot, such as a pointer to an indirect 1020 that points to data 1022 of the snapshot. The inofile 1018 may comprise or point to information relating to directories, access control lists, and/or other information.

A mapping metafile (a VMAP) is maintained for the object 1008. The mapping metafile maps block numbers of primary storage of the computing device 1002 (e.g., virtual volume block numbers of the data stored into slots of the object 1008) to cloud block numbers of nodes representing portions of the data stored within the slots of the object 1008. The object 1008 is stored within the object store 1009. In an example of storing objects into the object store 1009, the plurality of snapshots 1004, maintained by the computing device 1002, are stored within objects 1010 of the object store 1009. Each snapshot is identifiable through a snapinfo object that has a unique generation number. As will be described later, the objects 1010 within the object store 1009 may be deduplicated with respect to one another (e.g., the object 1008 is deduplicated with respect to the object 1010 using the mapping metafile as part of being stored into the object store 1009) and retain compression used by the computing device 1002 for storing the snapshots 1004 within the primary storage.

The mapping metafile and/or the data structure are used to provide access through the object file system to portions of data within the slots of the object 1008 in the object store 1009. In an example, the inode object and the data structure are traversed to identify a sequence number and slot number of requested data. The sequence number and the slot number are used to access the requested data within a corresponding slot of the object 1008. In an example, a read request targets a 100,000$^{th}$ level 0 block stored within the object 1008. The inode object is read to calculate which blocks in each level of the data structure will have 100,000 (e.g., 100,000/255 is a 493th block in level 1 and 493/255 is a 2$^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 1008 and a slot number. The sequence number corresponds to an object name of the object 1008 and the slot number is which slot the data is located within the object 1008.

In an embodiment, an on-demand restore of data within a snapshot stored within objects of the object store 1009 can be performed to a target computing device using the mapping metafile and/or the data structure. In an embodiment, the mapping metafile and/or the data structure may be used to free objects from the object store 1009 based upon the objects comprising snapshot data of snapshots deleted by the computing device 1002.

In an embodiment, the mapping metafile and/or an overflow mapping metafile are used to facilitate the copying of the snapshots to the object store 1009 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 1004 maintained by the computing device 1002 and copied into the objects 1010 of the object store 1009 as copied snapshots. An entry within the mapping metafile is populated with a mapping between a block number of data within a snapshot at the computing device 1002 (e.g., a virtual volume block number) and a cloud block number (e.g., a cloud physical volume block number) of a slot within an object into which the data was copied when the snapshot was copied to the object store 1009 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a $V_+$ tree, such as a special $B_+$ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 1002 within the primary storage, which are copied to the object store as copied snapshots). In an example, the block numbers may correspond to virtual volume block numbers of data of the snapshots stored by the computing device 1002 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 1002.

The mapping metafile and/or the overflow mapping metafile is used to determine what data of the current snapshot is to be copied to the object store 1009 and what data already exists within the object store 1009 so that only data not already within the object store 1009 is transmitted to the object store 1009 for storage within an object. Upon determining that the current snapshot is to be copied to the object store 1009, an invalidation phase is performed. In particular, a list of deallocated block numbers of primary storage of the computing device 1002 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 1009 and a prior copied snapshot already copied from the primary storage to the object store 1009 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 1009.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 1009 for storage as a new copied snapshot that is a copy of the current snapshot maintained by the node. The object is stored as a logical copy of the current snapshot. Also, additional compression is applied to this logical data, and information used to decompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 1009. Once the object is stored within the object store 1009, the mapping metafile and/or the overflow mapping metafile is updated with entries for the deduplicated set of changed block numbers based upon receiving an acknowledgment of the object being stored by the object store 1009. An entry will map a changed block number to a cloud block number of a slot within which data of the changed block number is stored in the object.

In an embodiment, the object file system is used to provide various primary storage system services for the object store 1009 in order to achieve efficient space and resource management, and flexible scaling in the object store 1009 (e.g., a cloud computing environment). Additionally, pseudo read only snapshots are provided through the object store 1009. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud computing environment) without changing the meaning or accessibility of useable data in the objects (e.g., a cloud object comprising a snapshot copy of primary data maintained by the computing device 1002). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 1009, such as a cloud computing environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud computing environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 1002, to the object store 1009 such as cloud services within the cloud computing environment.

In one embodiment, objects within the object store 1009 (e.g., objects within a cloud computing environment) can be maintained with a read only attribute such that data within objects can be overwritten/modified/freed so long as in-use data within the objects is not altered. In particular, an object may be maintained within the object store 1009, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 1002 is storing data of a snapshot of a local file system within a slot of an object, and thus the snapshot data is in-use until a particular event occurs such as the computing device 1002 deleting the snapshot). In an example, the object comprises snapshot data of a file system, a volume, a logical unit number (LUN), a file, or any other data of the computing device 1002. In this way, the object comprises a read only snapshot of data of the computing device 1002. In one example, a plurality of objects corresponding to read only snapshots of the file system of the computing device 1002 are stored within the object store 1009. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 1002 (a primary storage system). For example, an in-use slot may be a slot that comprises snapshot data (e.g., secondary/replicated data) of a snapshot created by a computing device 1002. The slot becomes an unused slot when the data is no longer actively referenced, used, and/or maintained, such as where the computing device 1002 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the computing device 1002 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 1002. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 1009. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 1002. The snapshot may be determined as being deleted by the computing device 1002, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 1002 (primary storage system) otherwise used to execute the garbage collection operation. The garbage collection operation free objects from the object store 1009 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 1009 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 1009. However, if the object is not unique to only deleted snapshot(s) such as where the object also stores data of an active/undeleted snapshot, then the object is not freed.

In an embodiment, defragmentation is provided for fragmented objects within the object store 1009. In an example, defragmentation is implemented by a cloud service or application executing in the object store 1009 in order to conserve resources otherwise used by a computing device 1002

(primary storage system) that would execute defragmentation functionality. An object within the object store 1009 is determined to be a fragmented object based upon the object comprising at least one freed slot from which data was freed. For example, a freed slot may comprise an unused slot comprising unused data no longer referenced/used by the computing device 1002 (e.g., data of a deleted snapshot). Accordingly, the fragmented object may comprise one or more in-use slots of in-use data currently referenced/used by a computing device 1002 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 1009.

The present system preserves deduplication and compression used by the computing device 1002 for snapshots when storing copied snapshots to the object store 1009 notwithstanding copied snapshots representing fully logical copies of data in the primary storage of the computing device 1002. In particular, deduplication is preserved because data that is shared in a snapshot (e.g., a local or primary snapshot created and maintain by the node) is also shared in a copied snapshot in the object store 1009. Deduplication of compression groups is maintained while logically representing the compression groups in a copied snapshot. Block sharing across multiple snapshots is also preserved so that merely changed blocks are transferred/copied to the object store 1009 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 1002 of the storage system since access to the primary storage of the computing device 1002 may be more read intensive, and thus read efficiency is prioritized over storage space efficiency. Because copied snapshots in the object store 1009 are infrequently accessed (e.g., cold data that is infrequently read), relatively larger compression groups can be employed for improved storage space efficiency within the object store, which also reduces network bandwidth for snapshot copying to the object store 1009.

In one embodiment, snapshots maintained by the computing device 1002 are copied to the object store 1009 as copied snapshots representing logical data of the snapshots. Data of the copied snapshots is stored into slots of objects that are deduplicated with respect to other objects stored within the object store 1009 and retain compression used by the computing device 1002 for the snapshots.

In an example, the computing device 1002 stores data within primary storage. The computing device 1002 may create snapshots of the data stored by the computing device 1002. For example, the computing device 1002 may create a snapshot of a file, a logical unit number, a directory, a volume, a storage virtual machine hosting a plurality of volumes, a file system, a consistency group of any arbitrary grouping of files, directories, or data, etc. The computing device 1002 may deduplicate data between the snapshots so that instead of storing redundant data blocks multiple times, merely references are stored in place of the redundant data blocks and point to original data blocks with the same data. The computing device 1002 may compress data within the snapshots, such as by creating compression groups of compressed data blocks.

The mapping metafile and/or the overflow mapping metafile is used to determine what data of the current snapshot is to be copied to the object store 1009 and what data already exists within the object store so that only data not already within the object store is transmitted to the object store 1009 for storage within an object. Upon determining that the current snapshot is to be copied to the object store, an invalidation phase is performed. In particular, a list of deallocated block numbers of primary storage of the computing device 1002 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

Figure 11:
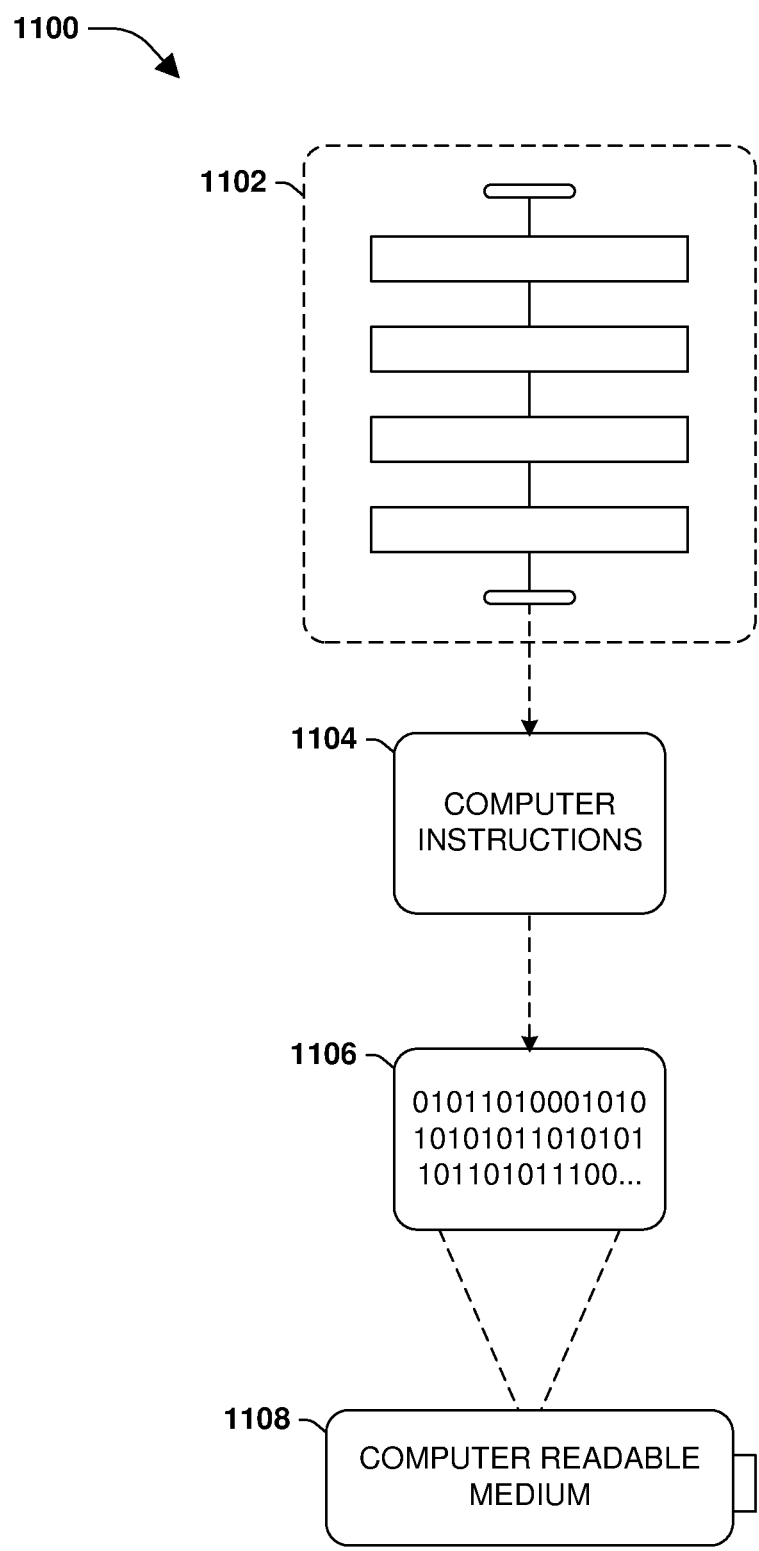
FIG. 11 is an example of a computer readable medium in which an embodiment of the invention may be implemented.

Still another embodiment involves a computer-readable medium 1100 comprising processor-executable instructions configured to implement one or more of the techniques presented herein. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises processor-executable computer instructions 1104 configured to operate according to one or more of the principles set forth herein. In some embodiments, the processor-executable computer instructions 1104 are configured to perform a method 1102, such as at least some of the exemplary method 400 of FIG. 4A, at least some of the exemplary method 450 of FIG. 4B, at least some of the exemplary method 700 of FIG. 7, and/or at least some of the exemplary method 900 of FIG. 9, for example. In some embodiments, the processor-executable computer instructions 1104 are configured to implement a system, such as at least some of the exemplary system 500 of FIGS. 5A-5E, at least some of the exemplary system 600 of FIG. 6, and/or at least some of the exemplary system 800 of FIGS. 8A-8F, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
in response to determining that a primary volume hosted by a primary node has experienced a failure, creating a secondary node on-demand in response to the failure;
generating an on-demand volume accessible to the secondary node, wherein a restore process is initiated to restore the on-demand volume to a state of the primary volume captured by a snapshot stored within an object store;
in response to copying metadata in the snapshot to the secondary node, providing clients with read and write access to the on-demand volume through the secondary node during the restore process;
incrementally backing up modifications made to the on-demand volume as on-demand volume snapshots stored within the object store; and
in response to the primary volume recovering from the failure, incrementally restoring the modifications from the on-demand volume snapshots to the primary volume.

2. The method of claim 1, wherein the providing the clients with read and write access comprises:
in response to receiving a first request from a client for a block of data not yet restored from the snapshot to the on-demand volume, retrieving the block from the snapshot in the object store; and
caching the block within a cloud block map as a cached block accessible to the client, wherein the cloud block map maps a cloud block number of the block to a physical volume block number of the cached block.

3. The method of claim 1, wherein the incrementally backing up modifications made to the on-demand volumes comprises:
evaluating a cloud block map, used to cache blocks not yet restored by the restore process, to identify unmodified restored data within the on-demand volume and modified data corresponding to the modifications to incrementally back up to the object store.

4. The method of claim 1, comprising:
in response to incrementally restoring the modifications to the primary volume, redirecting the clients to access the primary volume through the primary node.

5. The method of claim 1, comprising:
in response to incrementally restoring the modifications to the primary volume and redirecting the clients to access the primary volume through the primary node, destroying the secondary node and the on-demand volume.

6. The method of claim 1, comprising:
configuring a serverless disaster recovery relationship for the primary node, wherein the secondary node is generated on-demand in response to the failure.

7. The method of claim 1, wherein the metadata comprises root metadata of a file system.

8. The method of claim 1, comprising:
establish reverse resync between the primary volume and the object store by reconciling root and snapshot metadata objects between the primary volume and the object store.

9. The method of claim 1, wherein the incrementally restoring the modifications from the on-demand volume snapshots to the primary volume comprises:
in response to a delta between the primary volume and the on-demand volume being less than a threshold, perform a reserve resync by:
quiescing the clients from accessing the on-demand volume;
performing a final update of the on-demand volume to the object store;
performing a final incremental restore to the primary volume; and
failing the clients over to accessing the primary volume through the primary node.

10. The method of claim 1, comprising:
in response to incrementally restoring the modifications to the primary volume, establishing a mirroring relationship to backup snapshots of the primary volume to the object store.

11. The method of claim 1, comprising:
in response to incrementally restoring the modifications to the primary volume, rebuilding a metafile mapping virtual volume block numbers to cloud block numbers for resuming backups from the primary volume to the object store.

12. The method of claim 1, comprising:
performing backups from the primary volume to the object store by implementing a snapshot difference operation upon a snapshot of the primary volume at the primary node to identify a first set of information comprising inode numbers, levels within a first snapshot tree structure, file block numbers, and virtual volume block numbers.

13. A computing device comprising:
a memory comprising machine executable code; and
a processor coupled to the memory, the processor configured to execute the machine executable code to cause the processor to:
in response to detecting a failure associated with a virtual machine at a primary site, create a failover virtual machine data disk from a snapshot, of a virtual machine data disk of the virtual machine, stored within an object store;
boot a failover virtual machine into an operational state using the failover virtual machine data disk;
register the failover virtual machine to host an application previously hosted by the virtual machine before the failure;
incrementally back up data, written by the application within the failover virtual machine into the failover virtual machine disk, to the object store as failover snapshots;
in response to the primary site recovering from the failure, incrementally restore the failover snapshots from the object store to the primary site to create a restored virtual machine disk; and
restore the virtual machine at the primary site using the restored virtual machine disk.

14. The computing device of claim 13, wherein the machine executable code causes the processor to:
response to the virtual machine being restored, quiesce and destroy the failover virtual machine.

15. The computing device of claim 13, wherein the machine executable code causes the processor to:
evaluate a snapshot at the primary site to identify a first set of information comprising inode numbers, levels within a first snapshot tree structure, file block numbers, and virtual volume block numbers;
evaluate a corresponding cloud snapshot within the object store to identify a second set of information comprising inode numbers, levels within a cloud snapshot tree structure, file block numbers, and cloud block numbers; and
rebuild a metafile to record virtual volume block number to cloud block number mappings for common inode numbers, levels, and file block numbers amongst the first set of information and the second set of information.

16. The computing device of claim 13, wherein the machine executable code causes the processor to:
reconcile root and snapinfo objects in the object store with a copy of metadata in an on-demand secondary volume.

17. A non-transitory machine readable medium comprising instructions for performing a method, which when executed by a machine, causes the machine to:
create a secondary node on-demand in response to a failure of a primary volume hosted by a primary node;
generate an on-demand volume accessible to the secondary node, wherein a restore process is initiated to restore the on-demand volume to a state of the primary volume captured by a snapshot stored within an object store;
copy metadata in the snapshot to the secondary node;
provide clients with read and write access to the on-demand volume through the secondary node during the restore process;

incrementally back up modifications made to the on-demand volume as on-demand volume snapshots stored within the object store; and incrementally restore the modifications from the on-demand volume snapshots to the primary volume based upon the primary volume recovering.

18. The non-transitory machine readable medium of claim 17, wherein the instructions cause the machine to:

evaluate a snapshot of the primary volume at the primary node to identify a first set of information comprising inode numbers, levels within a first snapshot tree structure, file block numbers, and virtual volume block numbers;

evaluate a corresponding cloud snapshot within the object store to identify a second set of information comprising inode numbers, levels within a cloud snapshot tree structure, file block numbers, and cloud block numbers; and rebuild a metafile to record virtual volume block number to cloud block number mappings for common inode numbers, levels, and file block numbers amongst the first set of information and the second set of information.

19. The non-transitory machine readable medium of claim 17, wherein the instructions cause the machine to:

utilize latest root and snapinfo metadata copies in the object store to reconcile with a metadata copy in the primary volume for reconstructing a required state in the primary volume to be able to resync back to the object store.

20. The non-transitory machine readable medium of claim 17, wherein the metadata comprises root metadata of a snapshot filesystem.

* * * * *